US007016751B2

(12) United States Patent
Nordquist et al.

(10) Patent No.: US 7,016,751 B2
(45) Date of Patent: Mar. 21, 2006

(54) VACUUM SYSTEM CENTRAL CONTROL INFORMATION SERVER

(75) Inventors: John P. Nordquist, Mendon, MA (US); John M. Hann, Billerica, MA (US)

(73) Assignee: Helix Technology Corporation, Mansfield, MA (US)

( * ) Notice: Subject to any disclaimer, the term of this patent is extended or adjusted under 35 U.S.C. 154(b) by 885 days.

(21) Appl. No.: 09/948,303

(22) Filed: Sep. 6, 2001

(65) Prior Publication Data

US 2003/0014160 A1 Jan. 16, 2003

Related U.S. Application Data

(60) Provisional application No. 60/305,590, filed on Jul. 13, 2001.

(51) Int. Cl.
*G06F 19/00* (2006.01)

(52) U.S. Cl. ........................ 700/108; 700/282; 702/188

(58) Field of Classification Search .................. 700/83, 700/108, 109, 110, 282; 702/187.188, 187, 702/188

See application file for complete search history.

(56) References Cited

U.S. PATENT DOCUMENTS

| | | | | |
|---|---|---|---|---|
| 5,631,825 | A | 5/1997 | van Weele et al. | 700/83 |
| 5,956,487 | A * | 9/1999 | Venkatraman et al. | 709/218 |
| 6,139,177 | A * | 10/2000 | Venkatraman et al. | 700/83 |
| 6,272,400 | B1 * | 8/2001 | Jankins et al. | 700/282 |
| 6,321,272 | B1 * | 11/2001 | Swales | 709/250 |
| 6,370,448 | B1 * | 4/2002 | Eryurek | 700/282 |
| 6,445,969 | B1 * | 9/2002 | Kenney et al. | 700/108 |

(Continued)

FOREIGN PATENT DOCUMENTS

EP 0 809 164 11/1997

(Continued)

OTHER PUBLICATIONS

Bartolomeo, "SoftAutomation News", Rockwell Automation, Issue 2, 99.2.*

(Continued)

*Primary Examiner*—Leo Picard
*Assistant Examiner*—Chad Rapp
(74) *Attorney, Agent, or Firm*—Hamilton, Brook, Smith & Reynolds, P.C.

(57) ABSTRACT

Status information about the vacuum system is received by a server. A portion of the status information is formatted in response to a request from a web browser, and the formatted vacuum system information is forwarded to the web browser. Commands, including parameter values, can are entered by a user from the web browser, and implemented at the server or forwarded to the proper component in the vacuum system. A command or change history log of commands is maintained and forwarded to the web browser upon a request from the web browser. Status information includes information about an on-going regeneration of a pump in the vacuum system. Furthermore, regeneration can be controlled, i.e., started, stopped, parameters adjusted, in response to commands received from the web browser. Plural sets of regeneration parameters can be defined by a user from the web browser, and issued simultaneously to many devices. The vacuum system status information is be compared against one or more alarm definitions to determine whether an alarm exists, i.e., is "active." Active alarms are sent to the web browser. Furthermore, a historical log of alarms is maintained and a portion of it forwarded to the web browser upon a request for alarm history. Alarms may be enabled or disabled individually by means provided to the browser. Means are provided to the browser to allow a user to specify alarm definitions.

22 Claims, 25 Drawing Sheets

U.S. PATENT DOCUMENTS

2002/0116453 A1 * 8/2002 Todorov et al. ............ 709/203

FOREIGN PATENT DOCUMENTS

| | | |
|---|---|---|
| EP | 0 822 473 | 2/1998 |
| EP | 0825506 A2 | 2/1998 |
| WO | WO 98/33126 | 7/1998 |
| WO | WO 99/13388 | 3/1999 |
| WO | WO 99/19782 | 4/1999 |
| WO | WO 00/23860 | 4/2000 |
| WO | WO 00/49471 | 8/2000 |

OTHER PUBLICATIONS

Bak, "Broswer-based Access to PLCs", Nov. 1, 1999, Global Desing News.*

Babb, "Internet Infilitrates the Factory Floor", Apr. 1, 1998, Global Design News.*

"Web Server Bringd Factory Data to the Browser" Sep. 14, 1999, iFactory News Release.*

Ignatius, "The E-Manufacturing Domino Effect", Jul. 1, 2001.*

Weaver, "The Internet, Electronic Commerce, and Factory Automation", 2000.*

Non-browser prior art screens provided by the inventors that were disclosed over a year ago.

Baron, J., "Vacuum Network Controller," From *Patent Abstracts of Japan*, 2000, Abstract No. 2000073949.

On-Board Central Control (OCC), System-Wide Vacuum Management Software for the Vacuum Processing Industry, CTI-Cryogenics, Helix Technology Corporation, pp.: 1-6 (1999).

* cited by examiner

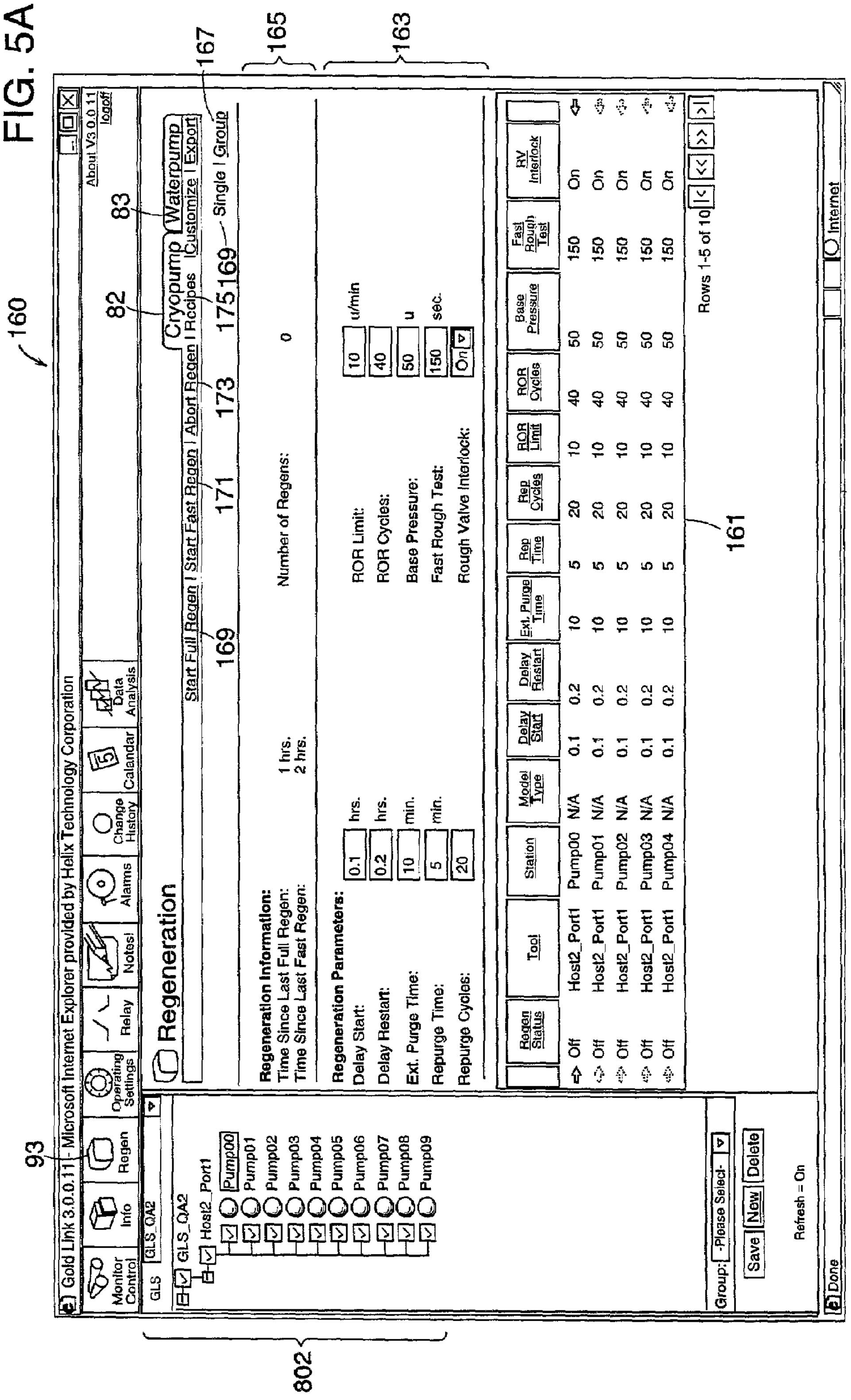

FIG. 5A

Gold Link 3.0.0.11 - Microsoft Internet Explorer provided by Helix Technology Corporation About V3 0.0.11   logoff

| Monitor Control | Info | Regen | Operating Settings | Relay | Notes | Alarms | Change History | Calendar | Data Analysis |

GLS | GLS_QA2

- Host2_Port1
  - Pump00
  - Pump01
  - Pump02
  - Pump03
  - Pump04
  - Pump05
  - Pump06
  - Pump07
  - Pump08
  - Pump09

802

Group: -Please Select-
Save | New | Delete
Refresh = On

Regeneration — 82  83 — Cryopump | Waterpump

Start Full Regen | Start Fast Regen | Abort Regen | Recipes | Customize | Export — 167
169   171   173   175 169 — Single | Group — 165
                                           163

Regeneration Information:
Time Since Last Full Regen: 1 hrs.
Time Since Last Fast Regen: 2 hrs.

Regeneration Parameters:
Delay Start: 0.1 hrs.
Delay Restart: 0.2 hrs.
Ext. Purge Time: 10 min.
Repurge Time: 5 min.
Repurge Cycles: 20

Number of Regens: 0

ROR Limit: 10 u/min
ROR Cycles: 40 u
Base Pressure: 50
Fast Rough Test: 150 sec.
Rough Valve Interlock: On ▼

160

| Regen Status | Tool | Station | Model Type | Delay Start | Delay Restart | Ext. Purge Time | Rep Time | Rep Cycles | ROR Limit | ROR Cycles | Base Pressure | Fast Rough Test | RV Interlock |
|---|---|---|---|---|---|---|---|---|---|---|---|---|---|
| ⇨ Off | Host2_Port1 | Pump00 | N/A | 0.1 | 0.2 | 10 | 5 | 20 | 10 | 40 | 50 | 150 | On |
| ⇨ Off | Host2_Port1 | Pump01 | N/A | 0.1 | 0.2 | 10 | 5 | 20 | 10 | 40 | 50 | 150 | On |
| ⇨ Off | Host2_Port1 | Pump02 | N/A | 0.1 | 0.2 | 10 | 5 | 20 | 10 | 40 | 50 | 150 | On |
| ⇨ Off | Host2_Port1 | Pump03 | N/A | 0.1 | 0.2 | 10 | 5 | 20 | 10 | 40 | 50 | 150 | On |
| ⇨ Off | Host2_Port1 | Pump04 | N/A | 0.1 | 0.2 | 10 | 5 | 20 | 10 | 40 | 50 | 150 | On |

161

Rows 1-5 of 10 |<| << | >> | >|

Done                                                 Internet

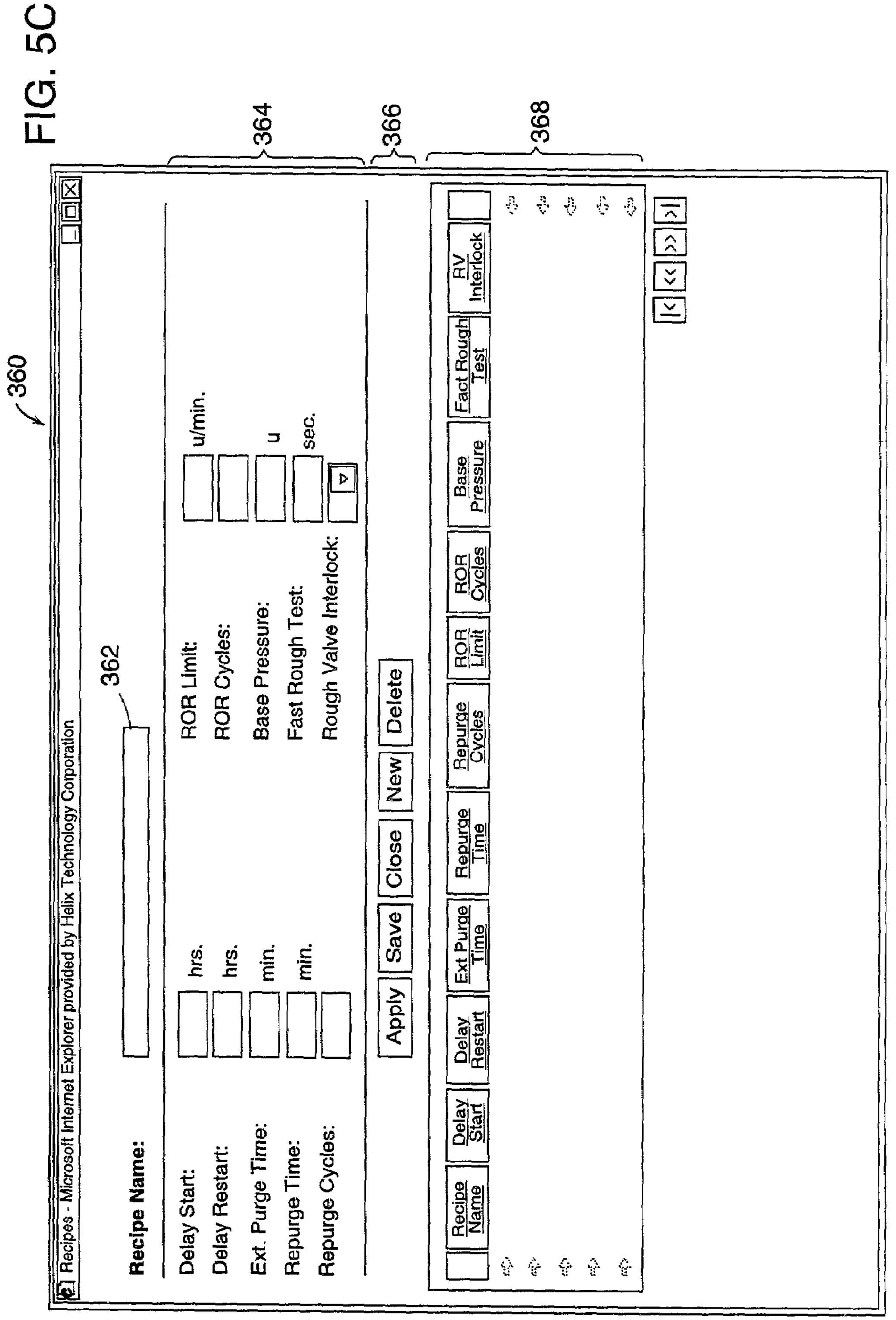

FIG. 5C

Recipes - Microsoft Internet Explorer provided by Helix Technology Corporation

Recipe Name: ␣␣␣␣␣ — 362

| Delay Start: | ␣ hrs. | ROR Limit: | ␣ u/min. |
| Delay Restart: | ␣ hrs. | ROR Cycles: | ␣ |
| Ext. Purge Time: | ␣ min. | Base Pressure: | ␣ u |
| Repurge Time: | ␣ min. | Fast Rough Test: | ␣ sec. |
| Repurge Cycles: | | Rough Valve Interlock: | ▷ |

Apply | Save | Close | New | Delete

Recipe Name | Delay Start | Delay Restart | Ext Purge Time | Repurge Time | Repurge Cycles | ROR Limit | ROR Cycles | Base Pressure | Fact Rough Test | RV Interlock

— 360

VACUUM SYSTEM CENTRAL CONTROL INFORMATION SERVER

RELATED APPLICATION

This application claims the benefit of U.S. Provisional Application No. 60/305,590, filed on Jul. 13, 2001.

The entire teachings of the above application are incorporated herein by reference.

BACKGROUND OF THE INVENTION

Vacuum systems often comprise a main vacuum pump which is driven by a drive motor and associated with various sensors, valves and other peripheral devices. The main vacuum pump may also be associated with a vacuum roughing pump and a secondary pump for specific gases such as water vapor. Cryopumps and turbomolecular pumps, for example, generally include temperature and pressure sensors, as well as purge and roughing valves. A turbomolecular pump may also be associated with a cryopump such as a single stage cryogenic water pump. Cryogenic water pumps also have associated sensors and control valves.

Cryogenic vacuum pumps, or cryopumps, that are currently available generally follow a common design concept. A low temperature array, usually operating in the range of 4° K. to 25° K., is the primary pumping surface. This surface is surrounded by a higher temperature radiation shield, usually operated in the temperature range of 60° K. to 130° K., which provides radiation shielding to the lower temperature array. The radiation shield generally comprises a housing which is closed except at a frontal array positioned between the primary pumping surface and a work chamber to be evacuated.

In operation, high boiling point gases such as water vapor are condensed on the frontal array. Lower boiling point gases pass through that array and into the volume within the radiation shield and condense on the lower temperature array. A surface coated with an adsorbent such as charcoal or a molecular sieve operating at or below the temperature of the colder array may also be provided in this volume to remove the very low boiling point gases such as hydrogen. With the gases thus condensed and/or adsorbed onto the pumping surfaces, only a vacuum remains in the work chamber.

In systems cooled by closed cycle coolers, the cooler is typically a two-stage refrigerator having a cold finger which extends through the rear or side of the radiation shield. High pressure helium refrigerant is generally delivered to the cryocooler through high pressure lines from a compressor assembly. Electrical power to a displacer drive motor in the cooler is usually also delivered through the compressor.

The cold end of the second, coldest stage of the cryocooler is at the tip of the cold finger. The primary pumping surface, or cryopanel, is connected to a heat sink at the coldest end of the second stage of the cold finger. This cryopanel may be a simple metal plate or cup or an array of metal baffles arranged around and connected to the second-stage heat sink. This second-stage cryopanel also supports the low temperature adsorbent.

The radiation shield is connected to a heat sink, or heat station, at the coldest end of the first stage of the refrigerator. The shield surrounds the second-stage cryopanel in such a way as to protect it from radiant heat. The frontal array is cooled by the first-stage heat sink through the side shield or, as disclosed in U.S. Pat. No. 4,356,701, through thermal struts.

After several days or weeks of use, the gases which have condensed onto the cryopanels, and in particular the gases which are adsorbed, begin to saturate the cryopump. A regeneration procedure must then be followed to warm the cryopump and thus release the gases and remove the gases from the system. As the gases evaporate, the pressure in the cryopump increases, and the gases are exhausted through a relief valve. During regeneration, the cryopump is often purged with warm nitrogen gas. The nitrogen gas hastens warming of the cryopanels and also serves to flush water and other vapors from the cryopump. By directing the nitrogen into the system close to the second-stage array, the nitrogen gas which flows outward to the exhaust port minimizes the movement of water vapor from the first array back to the second-stage array. Nitrogen is the usual purge gas because it is inert and is available free of water vapor. It is usually delivered from a nitrogen storage bottle through a fluid line and a purge valve coupled to the cryopump.

After the cryopump is purged, it must be rough pumped to produce a vacuum about the cryopumping surfaces and cold finger to reduce heat transfer by gas conduction and thus enable the cryocooler to cool to normal operating temperatures. The rough pump is generally a mechanical pump coupled through a fluid line to a roughing valve mounted to the cryopump.

Control of the regeneration process is facilitated by temperature gauges coupled to the cold finger heat stations. Thermocouple pressure gauges have also been used with cryopumps but have generally not been recommended because of a potential of igniting gases released in the cryopump by a spark from the current-carrying thermocouple. The temperature and/or pressure sensors mounted to the pump are coupled through electrical leads to temperature and/or pressure indicators.

Although regeneration may be controlled by manually turning the cryocooler off and on and manually controlling the purge and roughing valves, a separate regeneration controller is used in more sophisticated systems. Leads from the controller are coupled to each of the sensors, the cryocooler motor and the valves to be actuated.

Another form of vacuum pump used in high vacuum systems, such as semiconductor processing systems, is the turbomolecular pump. A turbomolecular pump comprises a high speed turbine which drives the gas molecules. Since the turbomolecular pump operates most efficiently in the molecular flow region, the gas molecules which are driven through the pump are removed by a roughing vacuum pump which maintains a vacuum in the order of 10.sup.–3 torr at the foreline, or exhaust, of the turbomolecular pump.

Because the gas as being pumped by the turbomolecular pump may be extremely corrosive or hazardous in other ways, it is often diluted by a purge gas in the foreline region of the pump. To that end, a purge valve is coupled to the pump to introduce purge gas from an inert gas supply. The purge gas is typically introduced into the motor/bearing region.

During shutdown of the pump, gas is typically introduced about the turbine blades through a separate vent valve. The vent gas prevents back streaming of hydrocarbons from the bearing lubricants in the foreline and assists in slowing of the pump by introducing a fluid drag.

To allow the turbomolecular pump to operate more effectively, some systems use a heater blanket about the housing to warm the blades and housing during operation and to thus evaporate any condensed gases. During continued operation, cooling water is circulated through the pump to prevent overheating of the bearings. Typical systems include a sensor for sensing bearing temperature in order to provide a warning with overheating.

A rack mounted control box is generally used to convert power from a standard electrical outlet to that required by the pump drive motor. The motor driving the turbine is typically a DC brushless motor driven through a speed control feedback loop or an AC synchronous motor. More sophisticated controllers may be connected to the various valves of the system to open and close those valves according to some user programmable sequence. Leads from the controller are coupled to the pump drive motor, the temperature sensor and each valve to be actuated.

Current vacuum monitoring systems allow users to monitor and control all of their vacuum equipment attached to a network of locally connected components. Originally, this required a PC running the monitor and control software to be connected to the component network via an RS-232 connection. This limited the distance that the PC could be from the components to about 50 feet.

A newer implementation of the monitor and control software uses a client/server architecture. This implementation allows a client to communicate with the component network via a server over a TCP/IP network, e.g., an ethernet local area network (LAN), greatly extending the communication range of the client to potentially anywhere within the company's corporate network.

SUMMARY OF THE INVENTION

There are several drawbacks to the existing client/server vacuum system monitor and control architecture as described above. For example, the monitor and control client PC requires the installation of a significant amount of specialized software. In addition, the connectivity requirements for the monitor and control client to the monitor and control server are complicated to set up and maintain, resulting in a non-robust implementation.

The present invention solves these problems by using a standard browser to provide all of the monitor and control functions. Because most standard computers have a browser installed, these computers are essentially ready to use interfaces for the monitor and control system.

Accordingly, a method for monitoring a vacuum system includes receiving a request from a client browser for vacuum system status information. The requested status information is retrieved, formatted and forwarded as a response to the request from the client browser.

The requested status information is retrieved using a database accessor to access information stored in a database, or using an equipment accessor to access information directly from vacuum system equipment. Both the database accessor and equipment accessor use the same format, such as XML recordsets, to report the accessed data.

Vacuum system equipment includes cryopumps, gauges, etc.

In one embodiment, the request from the client is an HTTP request. The response to such a request includes a screen document which the client browser uses to build or display a screen. The screen document may include HTML, XML and Javascript.

The screen document is one of plural screens populated with retrieved data.

One such screen is a monitor screen which provides real-time status information with respect to the vacuum system equipment, and can be any of: a tool monitor screen, a cryopump monitor screen, and a waterpump monitor screen.

Another such screen is an information screen which provides non-real-time status information with respect to the vacuum system equipment. The information screen is from the group of information screens comprising: a tool information screen, a cryopump information screen, and a waterpump information screen.

Another such screen is a regeneration screen which provides pump regeneration information. The regeneration screen provides the ability for a user at the client browser to change regeneration parameters for a selected pump. The regeneration screen as well provides the ability for a user at the client browser to start and/or abort a regeneration. The regeneration screen is from the group of regeneration screens comprising: a cryopump regeneration screen, and a waterpump regeneration screen.

The regeneration screen also provides the ability for a user at the client browser to define a group of selected pumps, to start regeneration of the group and to stop regeneration of the group. A user operator can define sets of parameters, called "recipes," to be issued simultaneously to plural pumps.

Another such screen is an operating settings screen which provides operating settings. Operating setting information includes settings such as, but not limited to, temperature control, power fail temperature, keypad lock, parameter lock and power fail mode. The operating settings screen provides the ability for a user to change the operating settings.

Another such screen is a relay parameters screen which provides parameter values for relays within the vacuum system. The relay parameters screen provides the ability for a user to modify the relay parameters.

Another such screen is an alarms screen which provides alarm information. In one embodiment, there are four subalarm screens. For example, one alarms sub-screen is an alarms configuration screen which provides the ability for a user to configure alarms. Another alarms sub-screen is an alarms enable screen which provides the ability for a user to enable and disable alarms. Another alarms screen is an active alarms screen which provides a list of active alarms, and provides the ability for a user to acknowledge individual active alarms. Finally, another alarms screen is an alarms history screen which provides a list of past alarms.

Another such screen is a change history screen which provides a list of updates and commands previously sent to vacuum system equipment.

Another such screen is a calendar screen which provides a calendar showing, for each day on the calendar, events which occurred on that day. The calendar screen provides the ability for a user to select at least one type of event for viewing. Events can include, for example, alarms, routines and changes.

Another such screen is a data analysis screen which allows a user to view information about regenerations. The data analysis screen provides the ability for a user to select for analysis from the group consisting of: full regenerations, fast regenerations, and all regenerations.

Each screen is associated with a unique screen identifier. Furthermore, each logical piece of equipment is associated with a unique serial number identifier (SNID), and a network address. Requests from the client include the screen identifier of the currently displayed screen and the SNIDs of equipment from which data is requested. An accessor is then selected responsive to the screen identifier, and each SNID in the request is translated to a network address if the request is processed by an equipment accessor. Of course, one skilled in the art would recognize that SNIDs are data elements that are optimal for use in databases, while addresses are data elements optimal for use in serial communications such as Ethernet and RS-232.

A request may also include one or more continuing parameters which identify the next screen to be displayed at the browser.

If the request is for an action, an actionator is selected responsive to the screen identifier, and action parameters in the request are passed to the selected actionator, the actionator communicating with the vacuum system to implement the requested action.

Update requests contain at least one parameter value to be updated.

A tree document is forwarded to the client browser, which displays the vacuum system in a hierarchical tree. The tree periodically requesting updates. The tree document comprises a Java applet, while tree updates comprise Javascript scripts which instruct the Java applet how to draw the tree.

A monitoring system for monitoring a vacuum system includes a web module which receives requests from a client browser for vacuum system status information. A database accessor accesses requested status information from a database and provides the accessed status information to the web module. An equipment accessor which accesses requested status information from the vacuum system and provides the accessed status information to the web module, the database accessor and equipment accessor using the same format to report the accessed status information to the web module. The web module formats the retrieved status information and forwards, as a response to the request from the client browser, the formatted vacuum system information to the client browser.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 5A is an illustrative computer screen display of a Cryopump Regeneration screen of an embodiment of the present invention.

FIG. 5C is an illustrative computer screen display of a Regeneration Recipe screen of an embodiment of the present invention.

DETAILED DESCRIPTION OF THE INVENTION

The present invention provides for the remote monitoring and control of devices and equipment of cryogenic process tools that are attached to a network to form a vacuum system. Using an Internet connection, the various tasks needed to gather data from, issue commands to, and track and alert operators to alarm conditions of such vacuum systems are integrated into a single system.

The devices and equipment of a vacuum system include process tools, chambers, pumps and peripherals such as gauges, valves, etc., collectively known as process elements. The present invention monitors and reports the current state of elements, alerts operators as to alarm conditions triggered by state changes, and reports on the equipment's historical activity and any actions or changes performed on the vacuum system. Typically, the process elements of process tools attached to a vacuum network are all under the supervision of a single vacuum network controller (VNC) or communications unit, through which the present invention accesses the process elements of the vacuum network.

Figure 1A:
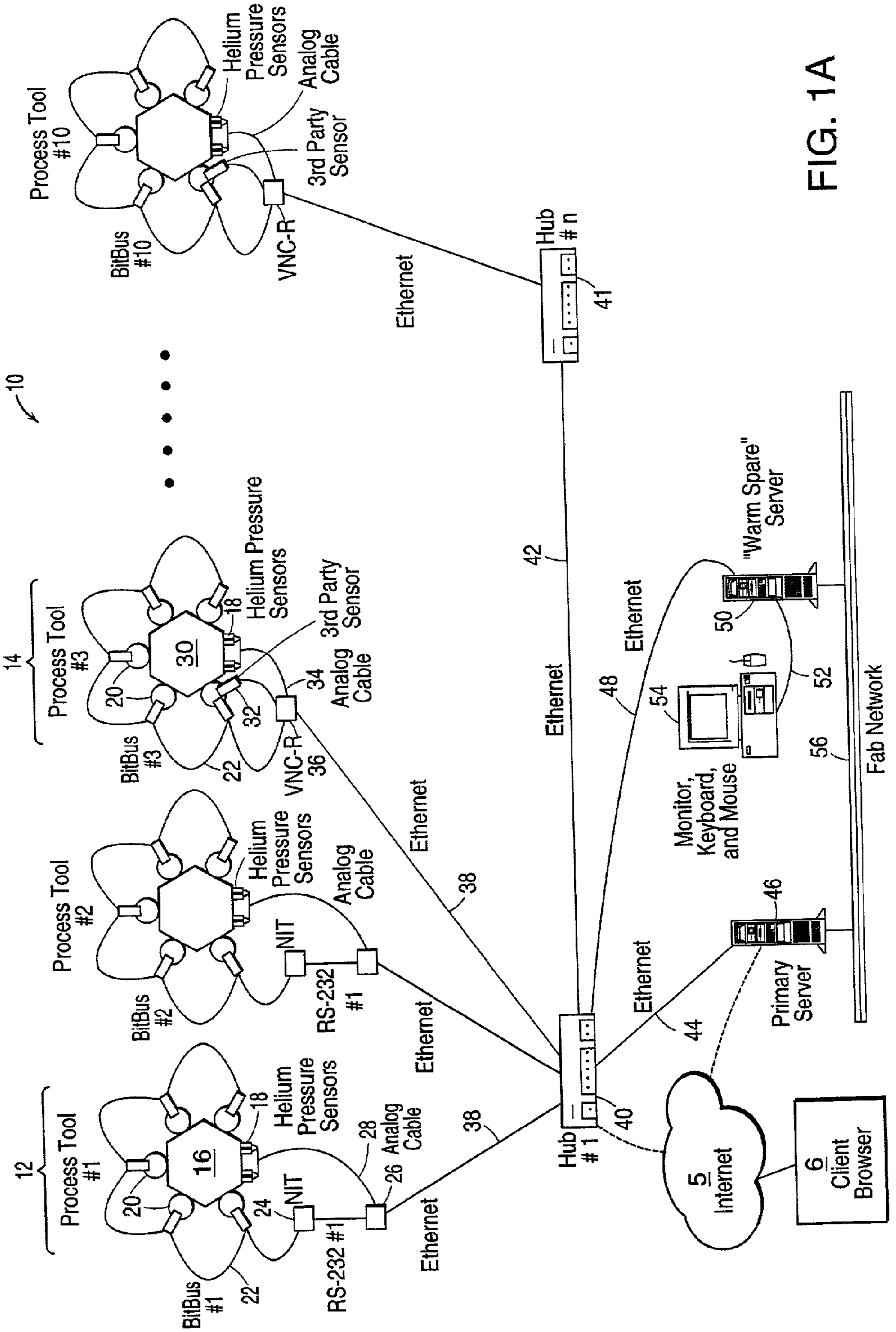
FIG. 1A is a schematic diagram illustrating a vacuum system data collection server communicating with plural cluster tool networks via a vacuum system information network.

FIG. 1A is a schematic diagram illustrating a vacuum system information network within, for example, a semiconductor fabrication facility (fab). Such a network is described in U.S. patent application Ser. No. 09/822,106, entitled "Vacuum System Information Network," filed on Mar. 30, 2001, the entire teachings of which are incorporated herein by reference.

A fabrication facility typically comprises several cluster or process tools 12, 14. Each cluster tool has an associated cluster tool network 22, which may connect, for example, waterpumps and cryopumps 20, as well as other devices. The devices on each tool 12, 14 are daisy-chained together via the cluster tool network 22, which terminates at a network interface terminal (NIT) 24 or at a vacuum network controller (VNC) 36. Each NIT is terminated at a communication unit (CU) 26 that provides an Ethernet connection to the network database servers 46, 50. VNCs provide direct Ethernet connections to the network database servers 46, 50.

The illustrative example of FIG. 1A has ten process tools 12, 14, four of which are shown. Process tool #1 12 comprises a cluster tool 16 which comprises several vacuum chambers (not shown). Each vacuum chamber is associated with a cryopump 20. The cryopumps 20 are connected by a cluster tool network 22, which may be implemented by, for example, a BitBus network. The cluster tool network 22 is a daisy chained network which connects to a network interface terminal (NIT) 24. Additional helium pressure sensors 18 connect via analog cable 28 directly to a communications unit 26. The NIT 24 also connects to the communications unit 26 via an RS-232 interface. The communications unit 26 then connects to a hub 40 over an ethernet connection 38.

Another process tool, for example, process tool #3 14, uses a vacuum network controller 36, such as that described in application Ser. No. 09/114,549, filed Jul. 13, 1998, the entire teachings of which are incorporated herein by reference. The vacuum network controller 36 connects directly to the cluster tool network 22 and interfaces directly to the helium pressure sensors 18 via analog cable 34. In addition, the vacuum network controller 36 can connect to third-party sensors 32. Finally, the vacuum network controller 36 connects via ethernet 38 to the hub 40.

Note that other tools such as process tool #10 may interface to a secondary hub 41. The secondary hub 41 is connected via an ethernet link 42 to hub #1 40. In this manner, plural hubs 40, 41 may be connected together to form a vacuum system information network 5 as described in an application Ser. No. 09/822,106.

In the example of FIG. 1A, hub #1 40 also connects via an ethernet link 44 to a primary network database server 46 that collects and analyzes data from the tools 12, 14. In addition, the hub 40 can connect to a spare server 50 via a second back-up ethernet link 48. Alternatively, the primary server 46 and/or warm server 50 may be linked to the vacuum network 5 via the Internet, although only the connection to the primary server 46 is shown. This may be especially useful where, for example, the cluster tools and servers are not located in the same facility. In the example shown, the primary network database server 46 and the "warm spare" server 50 are also connected via a fabrication network 56, using for example, ethernet or ISDN technology.

A computer/monitor 54 allows access to the information network and the stored data. To prevent overloading the primary network database server, the monitor 54 is connected to the "warm spare" server 50 over a link 52, although it could similarly be connected to the primary server 46. While the monitor 54 is shown connected directly to the spare server 50, it could also be connected to the server through the fab network 56, or even through other networks including the Internet, such as at client browser 6. Although only one monitor 54 is shown, it would be understood by one skilled in the art that there many monitors in multiple locations could communicate with one or both of the servers 46, 50 to provide operators with access to the information network.

The computer/monitor 54 includes a standard browser which allows an operator to interact with the server 50. The server can thus format data and controls into web pages to be displayed by the browser. Thus, no special software is required at the computer/monitor 54.

FIGS. 1B–13 illustrate various screens of an embodiment of the present invention, as might be presented at a computer/monitor 54. Other embodiments may use variations of these screens.

Figure 1B:
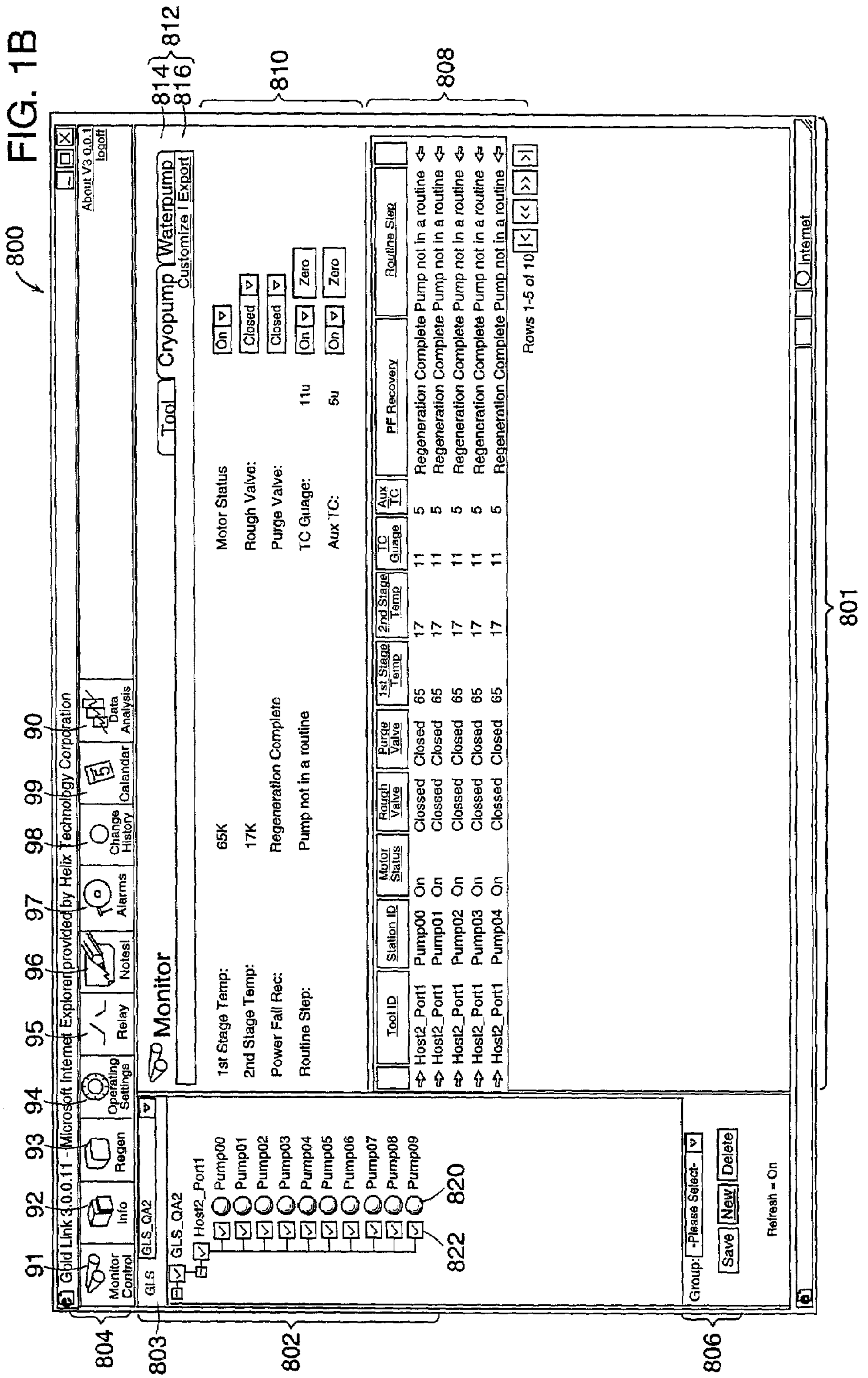
FIG. 1B is an illustrative computer screen display of an embodiment of the present invention.

FIG. 1B illustrates the basic layout 800 of the screens. In the illustrated embodiment, the screens are communicated to a client browser in the form of HTML and Javascript pages with Java applets. There are ten modes of operation corresponding to ten different basic screens or mode pages. Every mode page has at least a mode toolbar, and the process element tree with the group manager, discussed below.

The process element tree 802, located along the left edge of the mode page 801, is a Java applet that displays the process elements of the vacuum system network in a hierarchical fashion. This tree-like view gives an overview of the current vacuum system network at a glance, and provides a way to easily navigate among the process elements of the network.

Although capable of displaying several vacuum system networks simultaneously, in the illustrated embodiment, the tree 802 displays only one vacuum system network at a time. The vacuum system network being viewed may be changed by selecting a different vacuum network controller (VNC) or communications unit from the drop-down controller list 803 at the top of the tree 802.

The tree displays the process elements of the vacuum system network in three levels grouped by process tool. Each process element is represented by an individual node in the tree. At the top level, acting as the tree's root, is the VNC with which the system is currently interacting, here named "GLS_QA2". Below that are the controller's process tools, and below them, the process elements of each tool. In this example, there is only one process tool, named "Host2_Port1," which might, for example, correspond to one of the process tools 12, 14 of FIG. 1A. Process elements "Pump00" through "Pump09" are shown. The nodes of the tree 802 may be expanded or collapsed as desired.

The tree 802 is periodically updated, for example, about every five seconds, independently of operator actions.

Next to each element name is an icon 820 which indicates the current state of the process element represented by the node. The particular icon shown in FIG. 1B indicates that the associated element is available. Other icons can be used to indicate, for example, that a particular element is not available, that the element is offline, or that the element is in an alarm condition.

To the left of each icon 820 is a checkbox 822 used to mark the node for inclusion in the grid notebook 808, discussed below. The checkbox 822 has no effect other than to filter the associated process element out of the display, depending on the checkbox's state.

Each process element is assigned a unique logical identifier, called a serial number identifier, or SNID. An element's type and its SNID can be obtained by right-clicking on the node.

In addition to the tree 802, the typical screen layout 800 also has a mode toolbar 804, located just above each mode page 801. An operator uses the mode toolbar 804 to change from one mode of operation to another by clicking on the appropriate mode button. In the illustrated embodiment, there are ten modes and ten mode buttons: Monitor/Control 91, Information 92, Regeneration 93, Operating Settings 94, Relay Parameters 95, Notes 96, Alarms 97, Change History 98, Calendar 99 and Data Analysis 90.

A group manager 806 is also present for all modes of operation, and provides a device for defining and managing groups of process elements. Once defined, a named group may be used to filter the contents of the tree to a useful subset of elements.

The mode page 801 is generally divided into three areas. Except for the calendar mode (FIG. 11) and the data analysis mode plot screen (FIG. 13), all modes display selected, i.e., checked, process elements from the tree 802 in the grid notebook 808. The grid notebook 808 comprises multple grid-like pages, usually one page for each type of process element, i.e., tool, cryopump, waterpump, appearing in the tree 802, although some modes leave out the process tool page.

Each checked process element appears as a record in the grid page of the appropriate type, with two exceptions. First, the tool page of the Monitor/Control mode (FIG. 2) has one record for each chamber found on a process tool. Second, the pump pages of the Relay Parameters mode (FIG. 7) have a record for each of the two relays found on a pump.

Just above the grid notebook 808 is the edit panel 810, which provides increased visibility of the details of the record selected in the grid notebook 808, and provides the ability for an operator to modify the record data.

An action bar 812 contains tabs 814 for specifying pages, i.e., tool, cryopump or waterpump, of the grid notebook 808, and various controls 816 for actions the operator may take in the current mode of operation appear. Common to most of the screen modes are the "Customize" and "Export" controls 816. The "Customize" tab allows a user to delete certain columns from the grid notebook 808 or to add columns to the grid notebook 808 from a set provided by the system. The "Export" tab allows a user to export the data shown to an external file, such as a spreadsheet.

In one embodiment, whenever the user is not modifying data in the edit panel, the currently displayed screen is refreshed periodically, for example, every thirty seconds, although this is configurable during system setup. If the user is modifying data, the browser will wait until the user is finished before refreshing.

Figure 2:
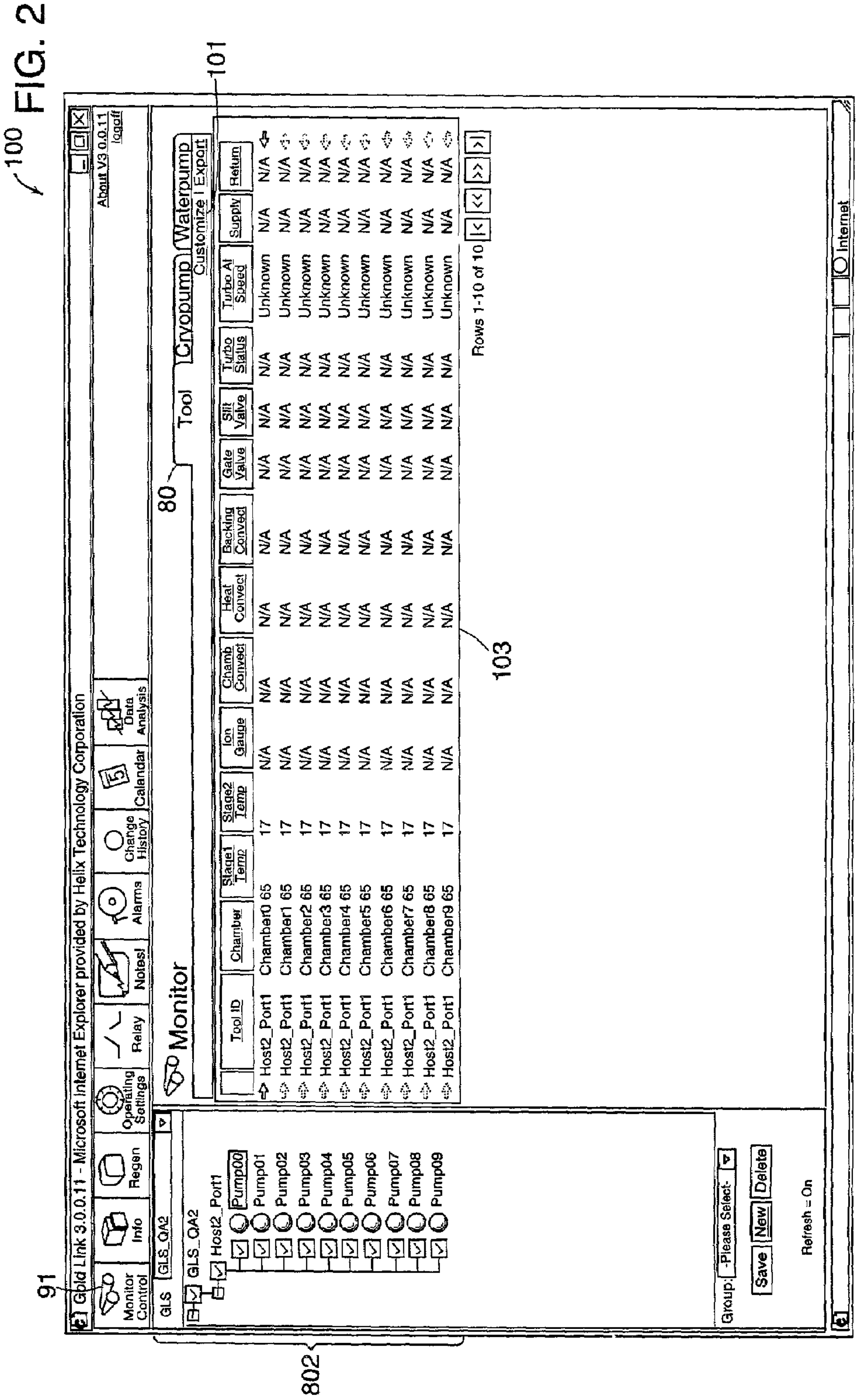
FIG. 2 is an illustrative computer screen display of a Monitor/Tool screen of an embodiment of the present invention.

FIG. 2 illustrates a Monitor/Tool Screen 100, which is displayed after the user first logs in, for example, with a user name and password, or later when both the "Monitor/Control" button 91 and tool tab 80 have been selected. This screen 100 displays real-time information 103 regarding vacuum components connected to the vacuum system information network, including the status of all components, organized by chamber, e.g., temperatures of cryopump stages 1 and 2, ion gauge, pressure gauges, valves, etc.

Figure 3:
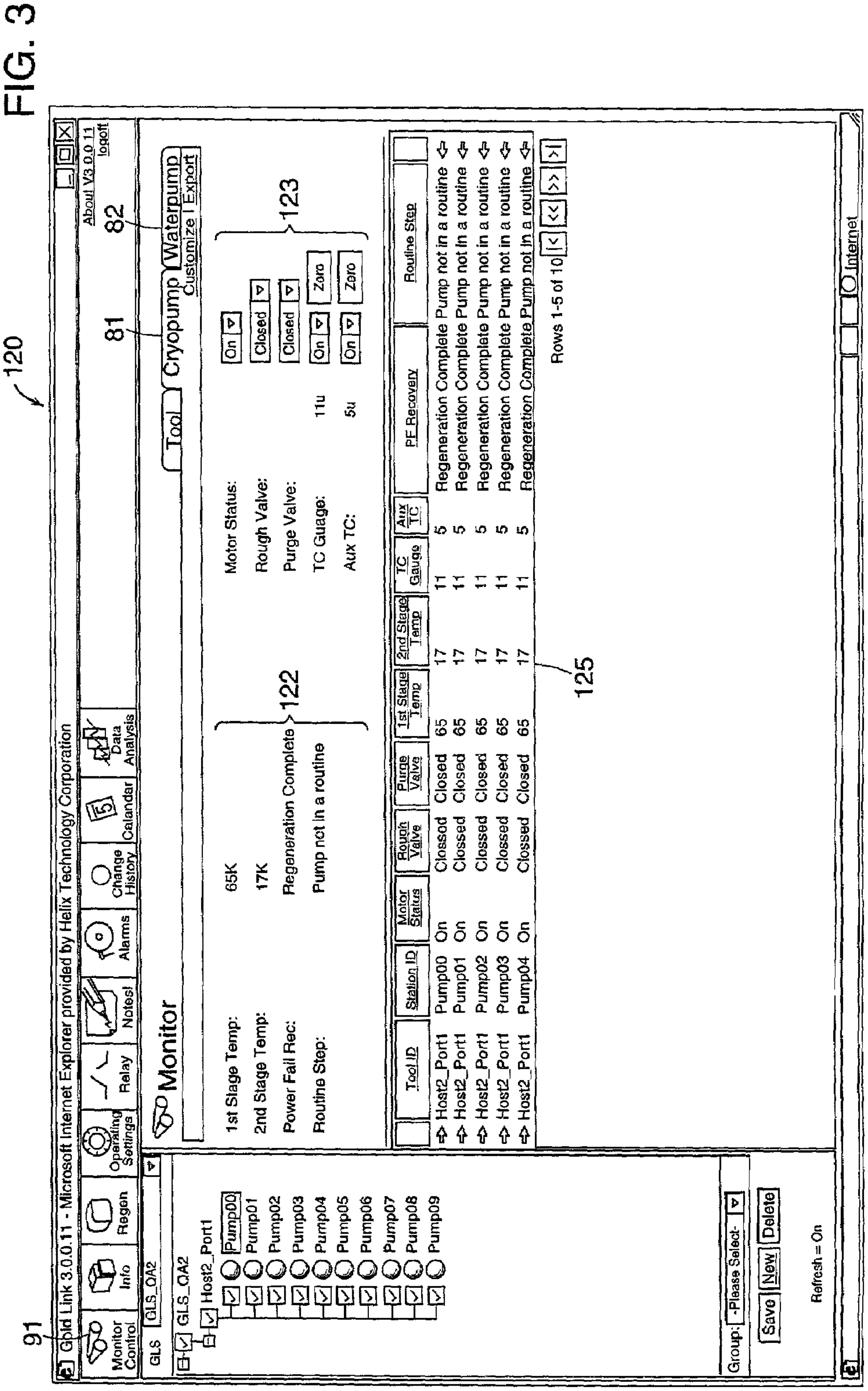
FIG. 3 is an illustrative computer screen display of a Monitor/Cryopump screen of an embodiment of the present invention.

FIG. 3 illustrates a Monitor/Cryopump Screen 120, which is displayed when the cryopump tab 121 selected. This screen 120 shows real-time information 125 regarding the cryopumps on the network. Status for the selected pump is repeated above at 122, and includes 1st and 2nd stage temperatures, the name of a power failure recovery routine, here called "Regeneration Complete", and the routine step, or action, which the selected device is currently executing, if any. Controls 123 also show status, while allowing for operator control of certain devices such as motors, valves, gauges, etc.

Similarly, selection of the Waterpump tab 82 displays information (not shown) pertaining to waterpumps.

Figure 4:
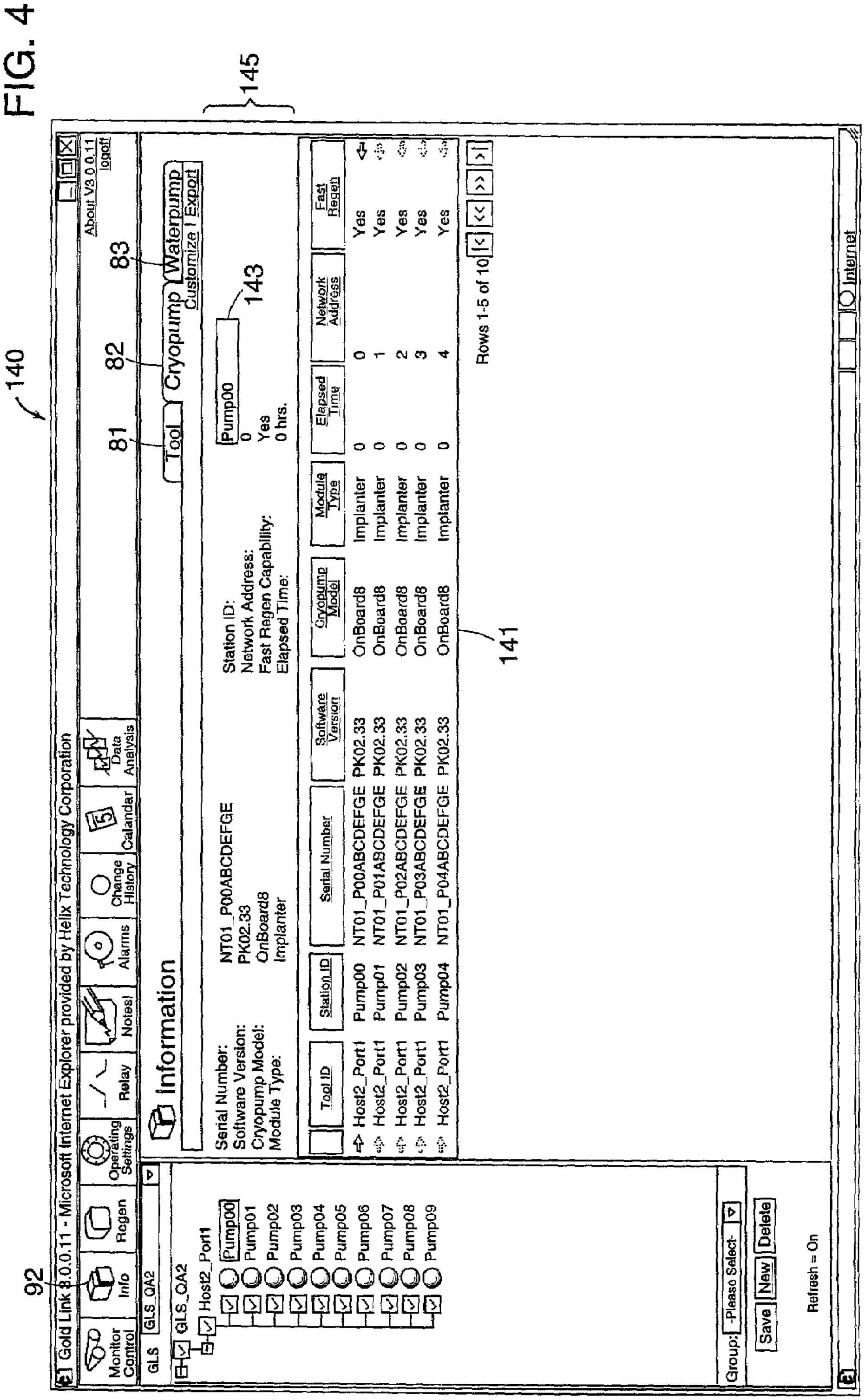
FIG. 4 is an illustrative computer screen display of an Information screen of an embodiment of the present invention.

FIG. 4 illustrates an Information screen 140, which is displayed when the "Info" mode button 92 is selected. The Information screen 140 displays relatively static, i.e., non-real-time, information 141 regarding each vacuum system component. Here, the Cryopump tab 81 has been selected, so the displayed information 141 is with respect to cryopumps. A special area 145 displays the same information for the selected pump. A text entry field 143 allows the user to change the identifier (ID) for a given cryopump. This identifier name is then displayed on the tree to the left. Note that Tool and Waterpump listings are also available through selection of the respective tabs 81, 83.

Figure 5B:
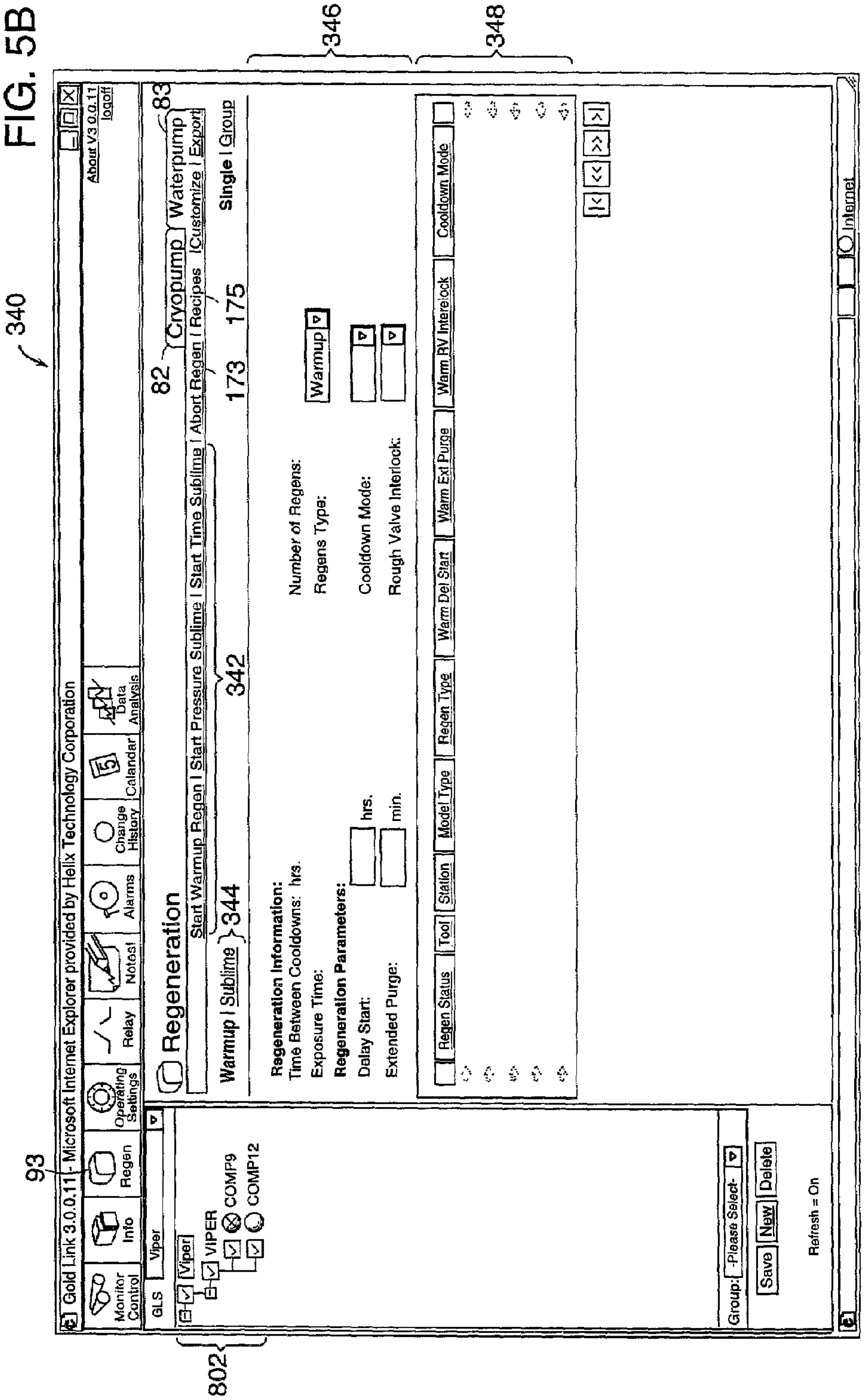
FIG. 5B is an illustrative computer screen display of a Waterpump Regeneration screen of an embodiment of the present invention.

FIGS. 5A and 5B illustrate Cryopump and Waterpump Regeneration screens 160, 340, respectively. These screens are displayed when the "Regen" button 93 is selected.

The Cryopump Regeneration screen 160 of FIG. 5A is displayed when the "cryopump" tab 82 is selected. This screen 160 displays information 161 regarding regeneration of each cryopump. Portion 163 of this screen allows the user to view and/or change the regeneration parameters for a selected pump. The user can also start a full or fast regeneration via controls 169 or 171 respectively, or abort an on-going regeneration via control 173. For example, a full regeneration might take four hours, while a fast regeneration takes only one hour. The fast regeneration, while quicker, typically does not bring the cryopump to room temperature, and thus does not remove water vapor from the system.

Portion 165 of the Regeneration screen displays regeneration statistics for the selected pump, including the time since the last full regeneration, the time since the last fast regeneration, and the number of completed regenerations.

Finally, by entering a group mode through the "Group" selector 167, a user is able to set up groups of pumps to be regenerated together. The starting and/or stopping of these group regenerations are performed on this screen. Selection of the "Single" selector 169 returns to the screen shown in FIG. 5A.

The Waterpump Regeneration screen 340 of FIG. 5B is displayed when the "waterpump" tab 83 is selected. This screen 340 displays information at 348 regarding regeneration of each waterpump. Portion 346 of this screen allows the user to view and/or change the regeneration parameters for a selected pump.

The user can also start various types of waterpump regeneration operations, such as warm regeneration, pressure sublime and time sublime operations, from tab 342. Parameters for these operations can be viewed and set by selecting one of the options of tab 344.

Each cryopump or waterpump may have its own set of regeneration parameters. In a system with many pumps, it would be very burdensome to require a user to adjust the parameters of each pump before starting regeneration. Therefore, macro-like "recipes" can be defined via the "Recipes" control 175, by creating and naming sets of parameters which may be issued simultaneously to many devices, as described with reference to FIG. 5C.

FIG. 5C illustrates an exemplary screen 360 which is displayed for the highlighted pump when the "Recipes" control 175 is selected. A recipe name can be entered in field 362, and the various parameters can be entered at 364. Recipes can be applied, saved, created and deleted via control buttons 366.

The "Apply" button applies the selected recipe to all of the pumps listed in the grid of the "Regeneration" screen, i.e., grid 161 of FIG. 5A or grid 348 of FIG. 5B. That is, before entering the "Recipe" screen 360, the user checks or unchecks the items from the tree 802 (FIGS. 5A or 5B) to select the pumps to which a recipe is to be applied. The selected pumps appear in the respective grid 161, 348. Then, using the Recipe screen of FIG. 5C, the user selects the recipe and clicks on the "Apply" button. A confirmation box appears, displaying the pumps to be affected by the application of the selected recipe.

Field 368 displays existing recipes (none shown in FIG. 5C). When a recipe is selected from field 368, the related parameters fill the fields at 364 for possible editing.

Figure 6:
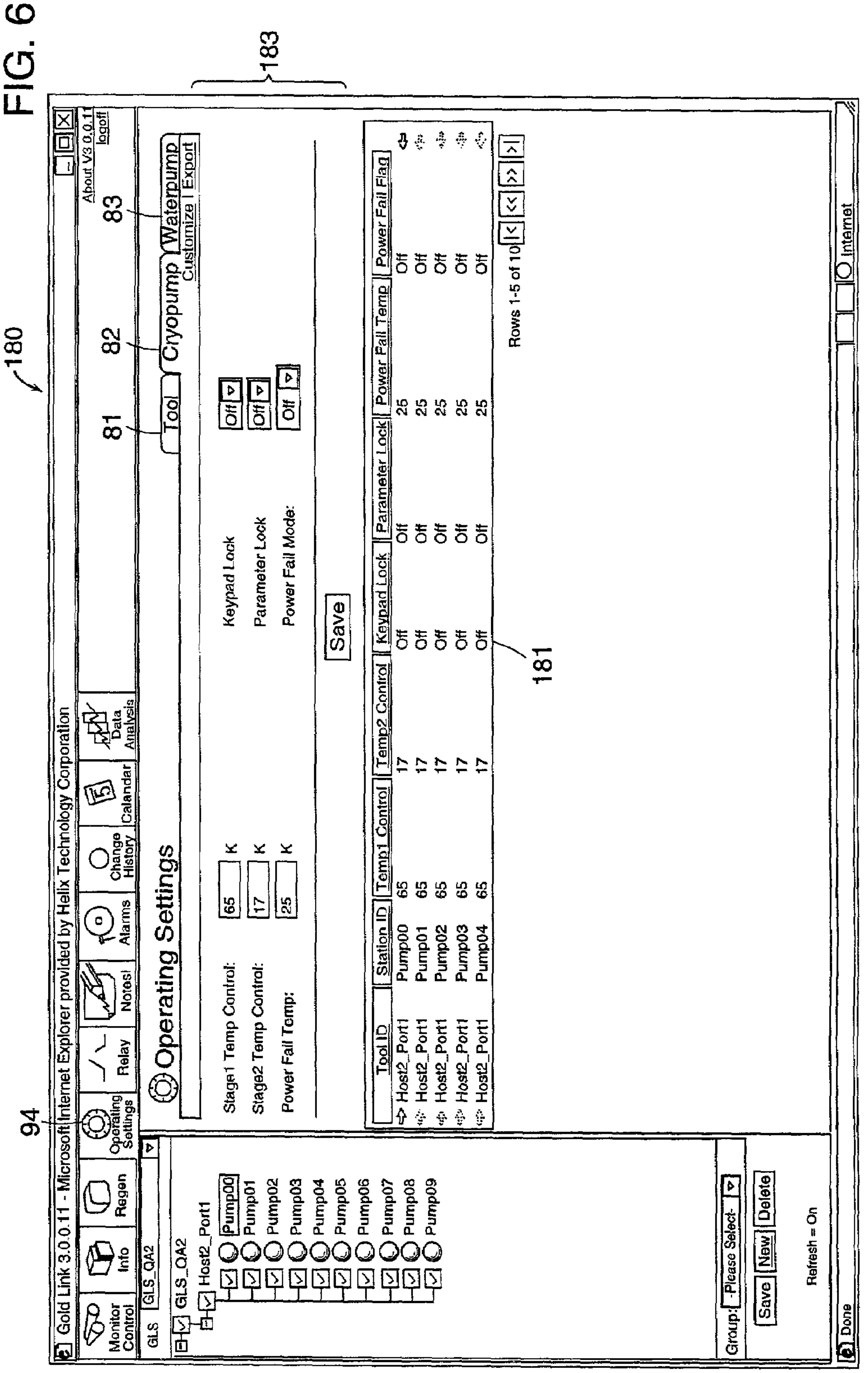
FIG. 6 is an illustrative computer screen display of a Operating Settings screen of an embodiment of the present invention.

FIG. 6 illustrates an Operating Settings screen 180, which is displayed when the "Operating Settings" mode button 94 is selected. This screen allows a user to view tool or pump settings such as temperature control, power fail temperature, keypad lock, parameter lock, power fail temperature, power failure flag, etc., in the information portion 181 of the screen, and to change and save the settings in control portion 183. Note that Tool, Cryopump and Waterpump displays are each available through selection of the respective tabs 81–83.

Figure 7:
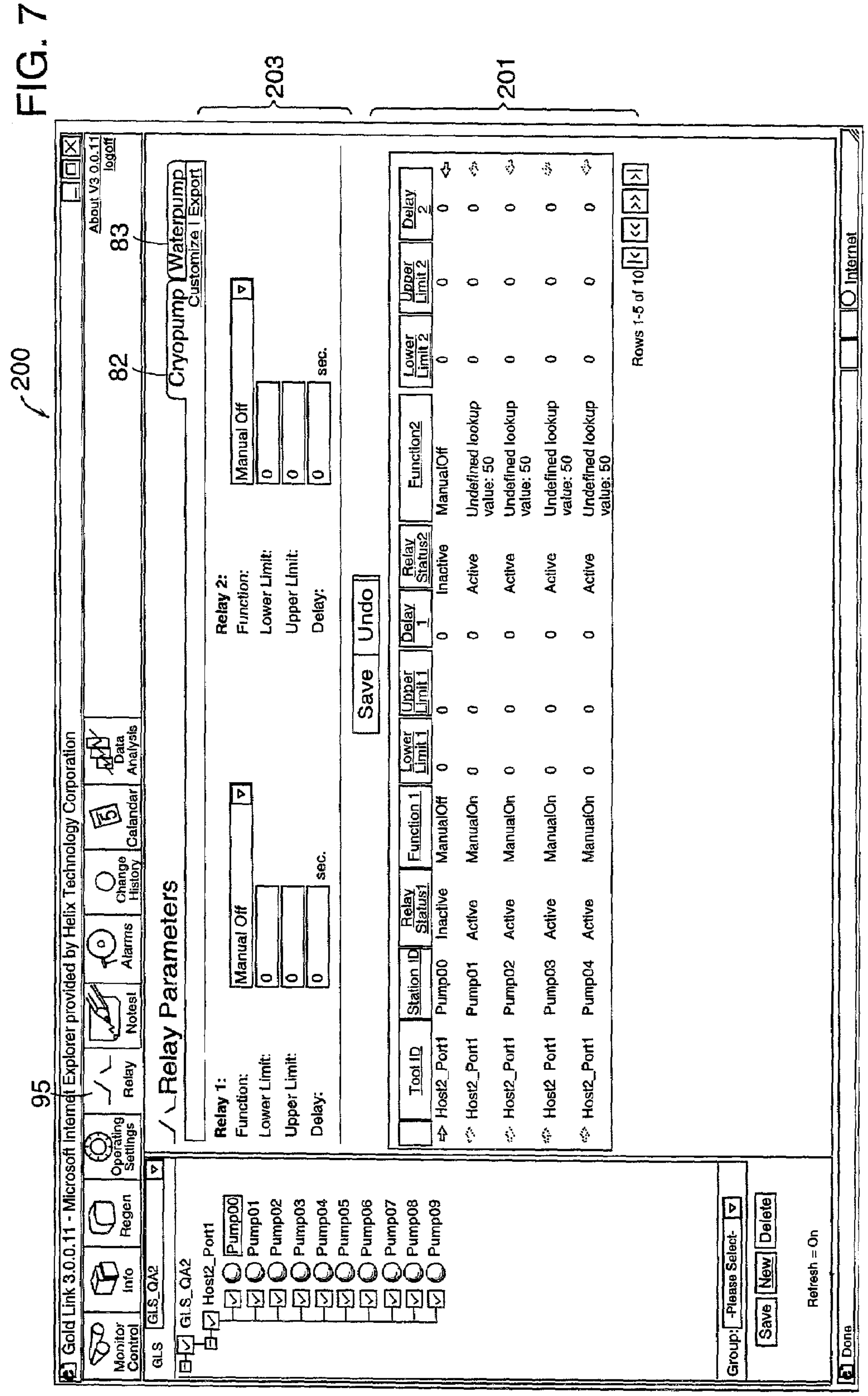
FIG. 7 is an illustrative computer screen display of a Relay Parameter screen of an embodiment of the present invention.

FIG. 7 illustrates a Relay Parameter screen 200, which is displayed when the "Relay" mode button 95 is selected. The Relay Parameter screen 200 allows a user to view, in portion 201, information regarding various relays within the vacuum system, for example, those located on the pumps. Portion 203 of the screen allows the user to configure these same parameters, save the configuration or undo the changes.

Figure 8:
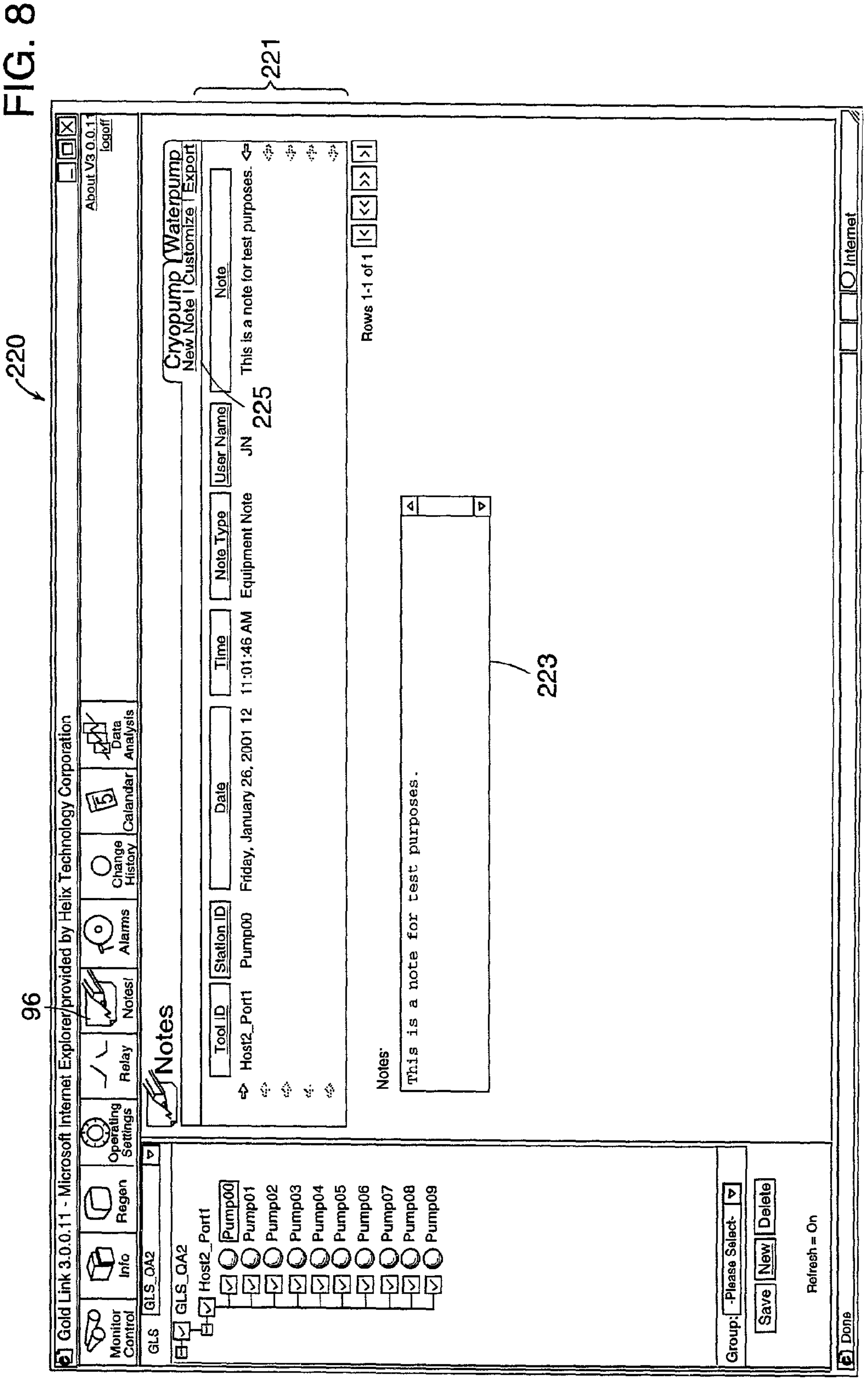
FIG. 8 is an illustrative computer screen display of a Notes screen of an embodiment of the present invention.

FIG. 8 illustrates a Notes screen 220, which is displayed when the "Notes" mode button 96 is selected. The Notes screen 220 allows the user to view notes related to equipment, alarms, changes, and regenerations. The notes are viewable in screen portion 221. If a note is larger than the space allowed, the fall note can be viewed in the note field 223 when selected. Once created, notes cannot be edited.

A new note can be added by clicking on the "New Note" tab 225, which brings up a pop-up dialog box, in which the user can create the text of the note, and associate the note with a particular piece of equipment.

Notes can also be attached to events, such as alarms, changes and regenerations, as discussed later with respect to FIGS. 9C, 9D, 10 and 12.

Figure 9A:
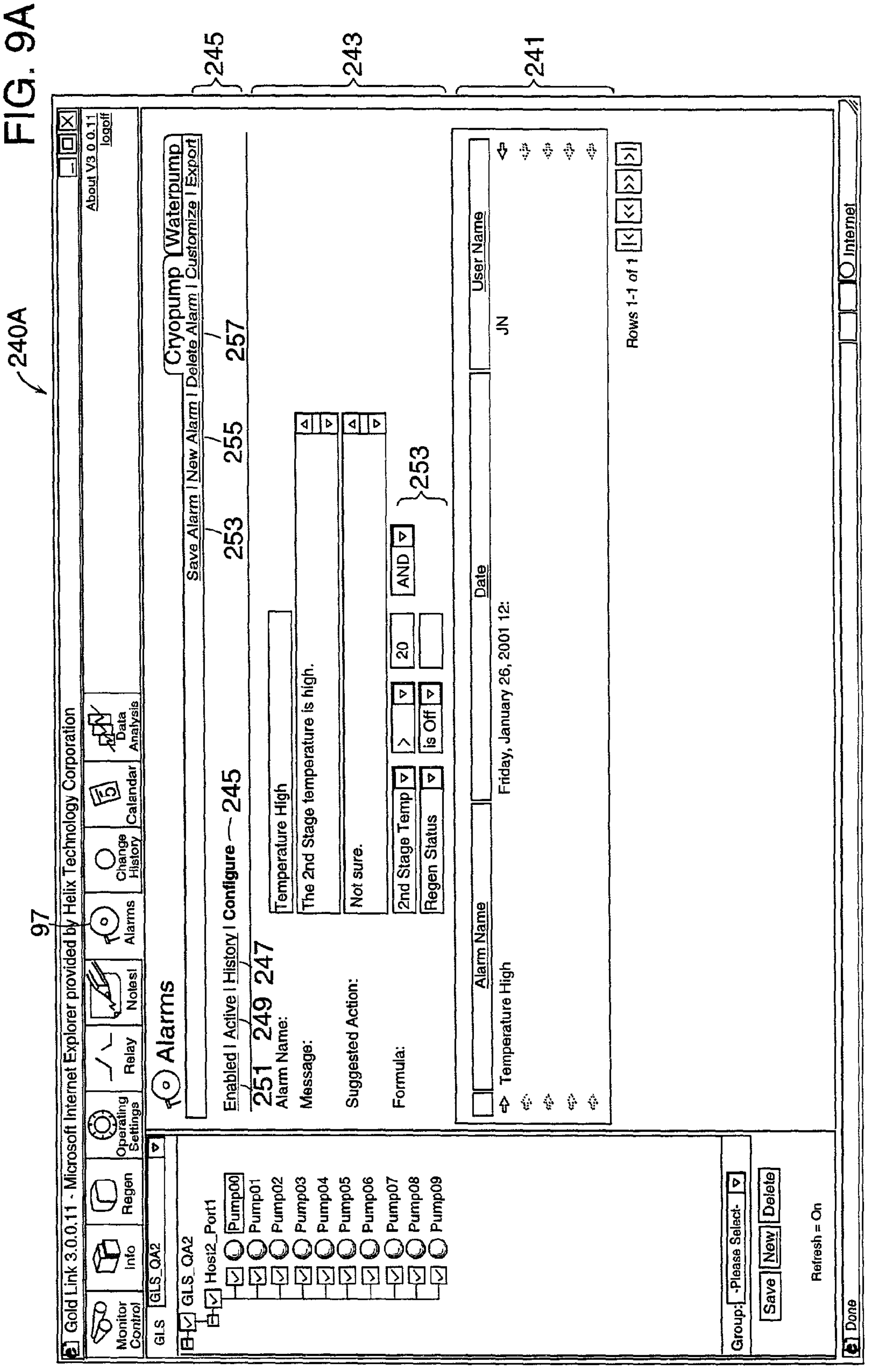
FIGS. 9A–9D are illustrative computer screen displays of Alarm screens of an embodiment of the present invention.

FIG. 9A illustrates an Alarm screen 240A, which is displayed when the Alarm button is selected. Using the related Alarm screens (FIGS. 9A–9D), a user can configure, enable/disable, and/or view current and historical.

For example, the Alarm screen 240A of FIG. 9A is that displayed when the "Configure" tab 245 is selected. In screen portion 243, the user can name an alarm and associate the alarm with a unique message to be used in the alarm system. The user is also able to define, in the formula section 253, the conditions under which an alarm is asserted. This provides the user with the flexibility to define unique alarms for his or her needs.

Figure 9B:
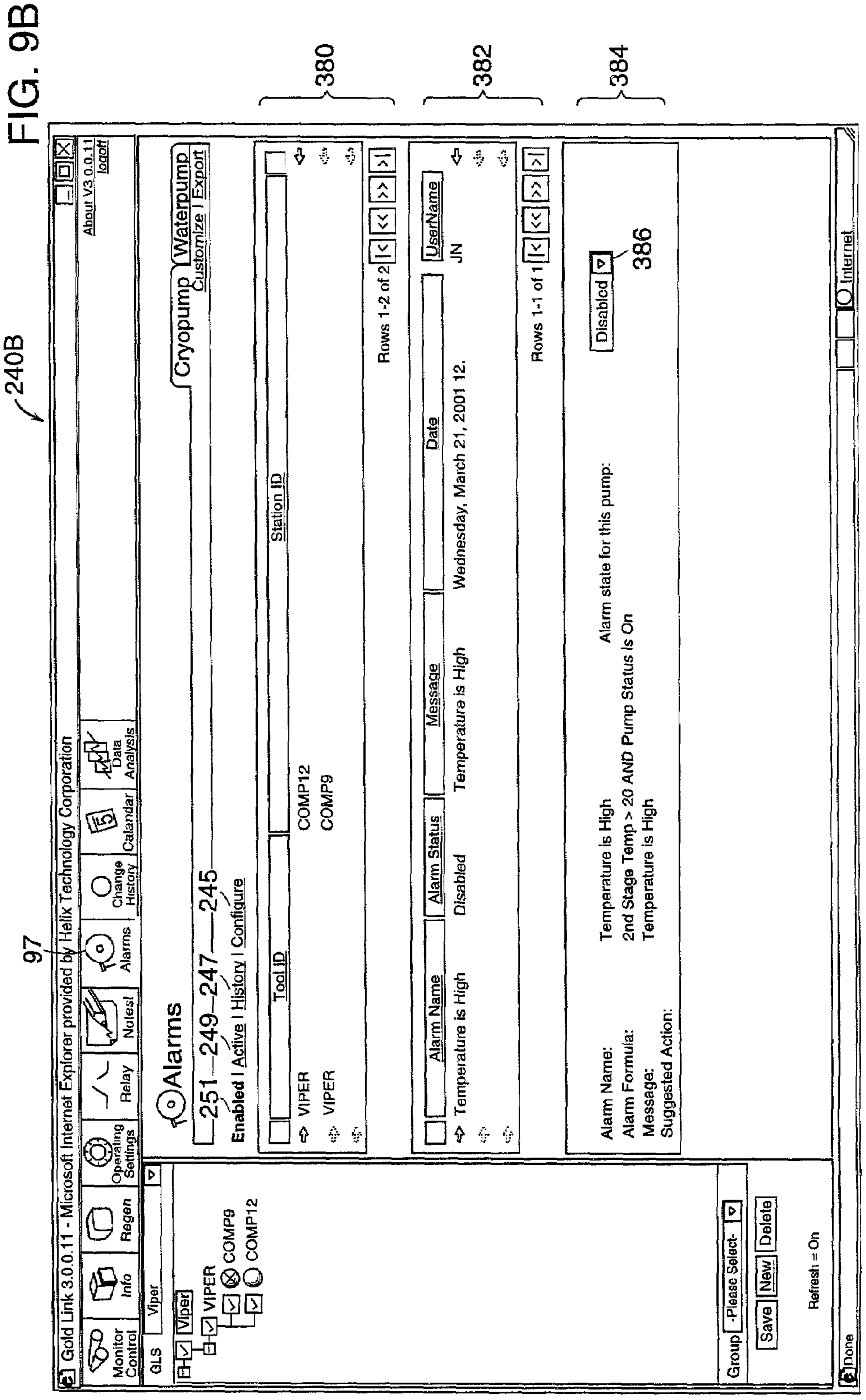

FIG. 9B illustrates a screen 240B displayed when the "Enabled" alarm tab 251 is selected. The screen shows a list 380 of tools and components. When an item from list 380 is selected, all alarms associated with the listed component are shown in an alarm list 382. Area 384 shows specific information for a selected alarm. The selected alarm can be enabled or disabled through control 386.

Figure 9C:
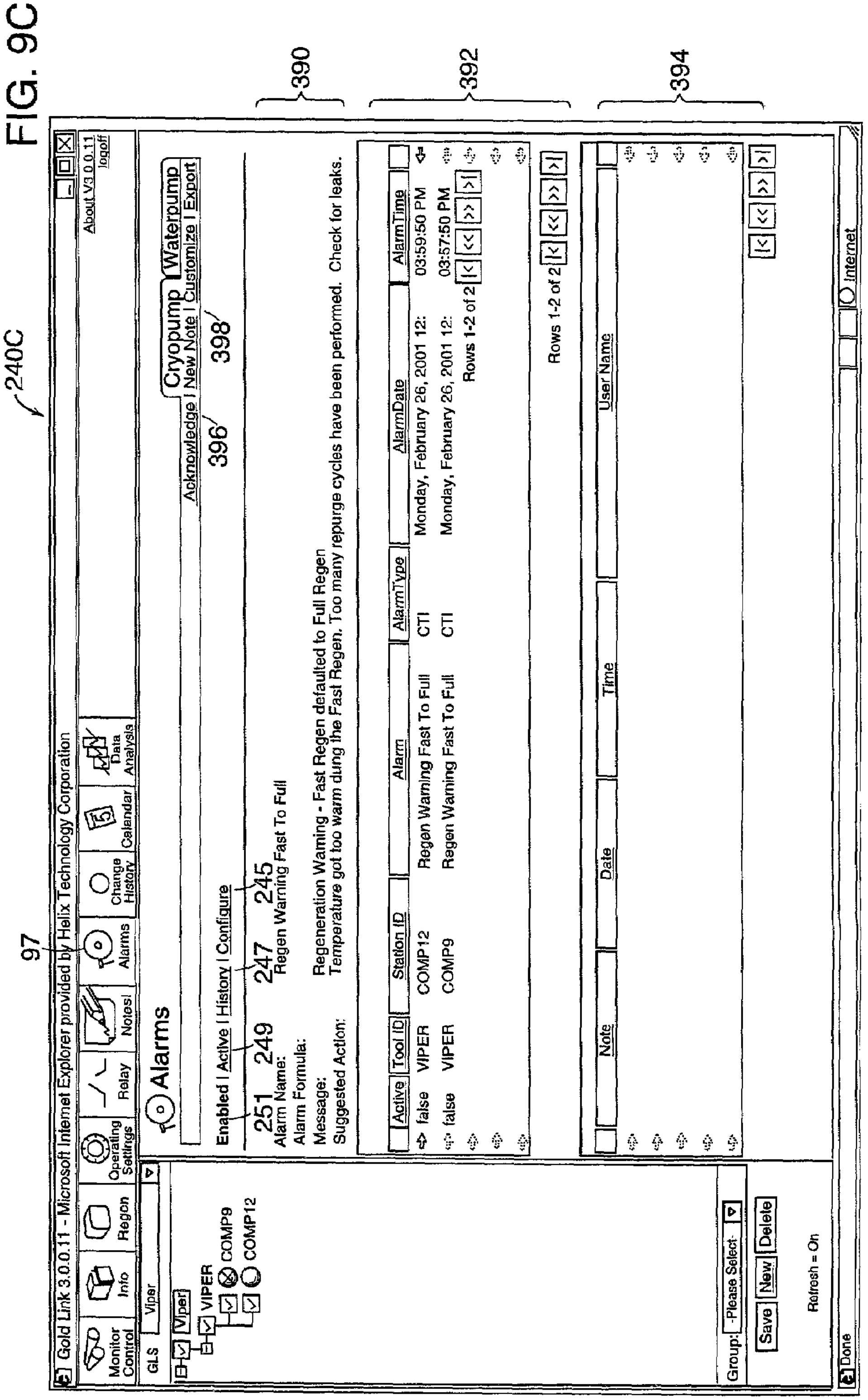

FIG. 9C illustrates a screen 240C displayed when the "Active" alarm tab 249 is selected. The screen shows a list 392 of currently active alarms in the system, i.e., alarms whose alarm conditions are satisfied. Details of a selected alarm are shown in area 390. An alarm can be acknowledged by a user by selected the "Acknowledge" tab 396. The user can also enter a note about the selected alarm by selected the "New Note" tab 398. Existing notes are displayed in note field 394, along with the date and time the note was created, and the note's author. The "Active" column indicates whether an alarm is active or not. An alarm remains on the Active grid until it is acknowledged by the user. Once an alarm is acknowledged, it is removed from the grid.

Figure 9D:
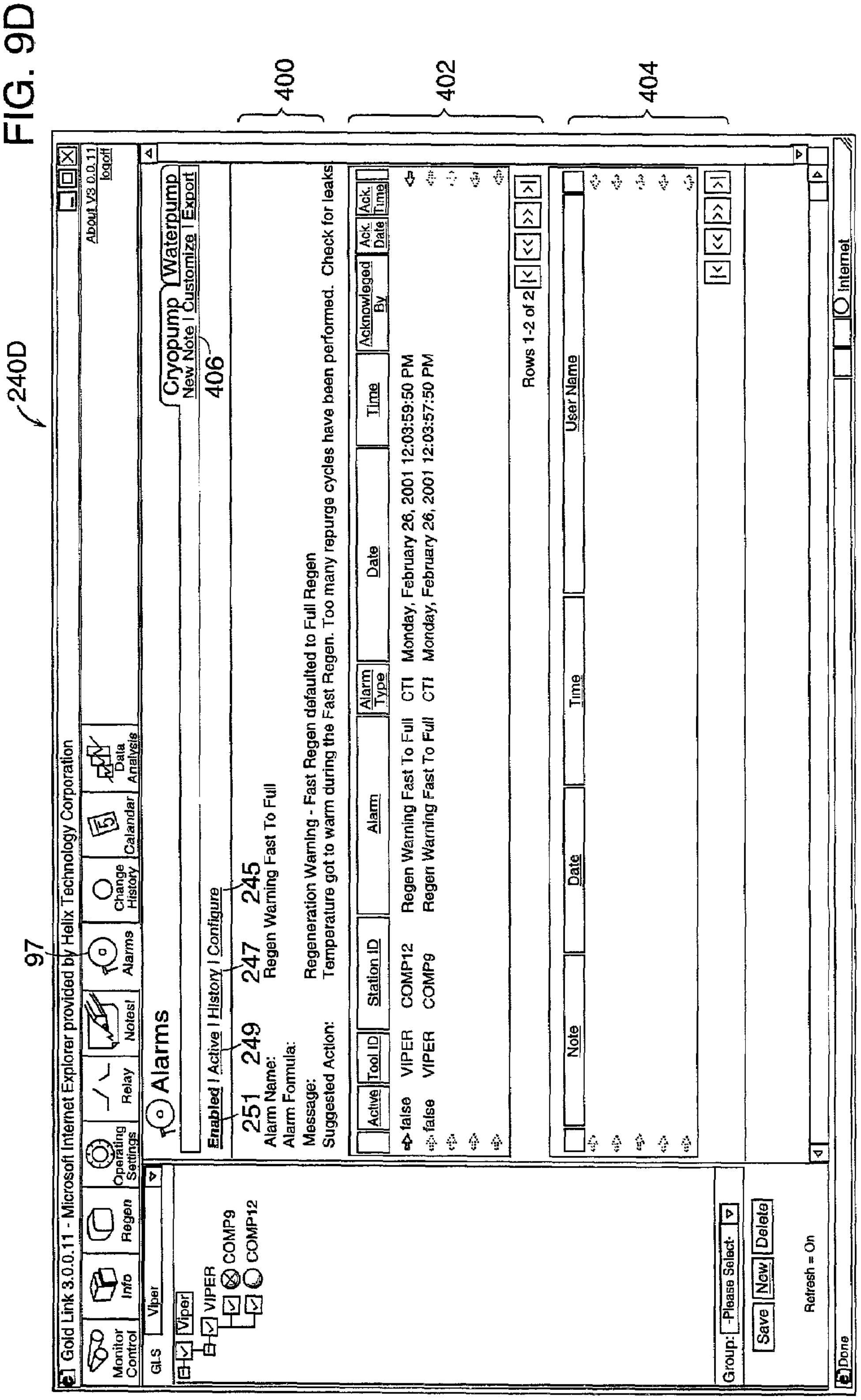

FIG. 9D illustrates a screen 240D displayed when the "History" alarm tab 247 is selected. The screen shows a list 402 of alarms that have been generated in the past. Details of a selected alarm are shown in area 400. Notes entered by a user via the "New Note" tab 406 appear in area 404.

New alarms can be created and saved via the "New Alarm" tab 255 and the "Save Alarm" tab 255 respectively. Selecting an alarm in the alarm list 241 brings up data for the selected alarm in the alarm edit field 243. Alarm data can be modified by entering new data and saved via the "Save Alarm" tab 255. Alternatively, a selected alarm can be deleted via the "Delete Alarm" tab 257.

Figure 10:
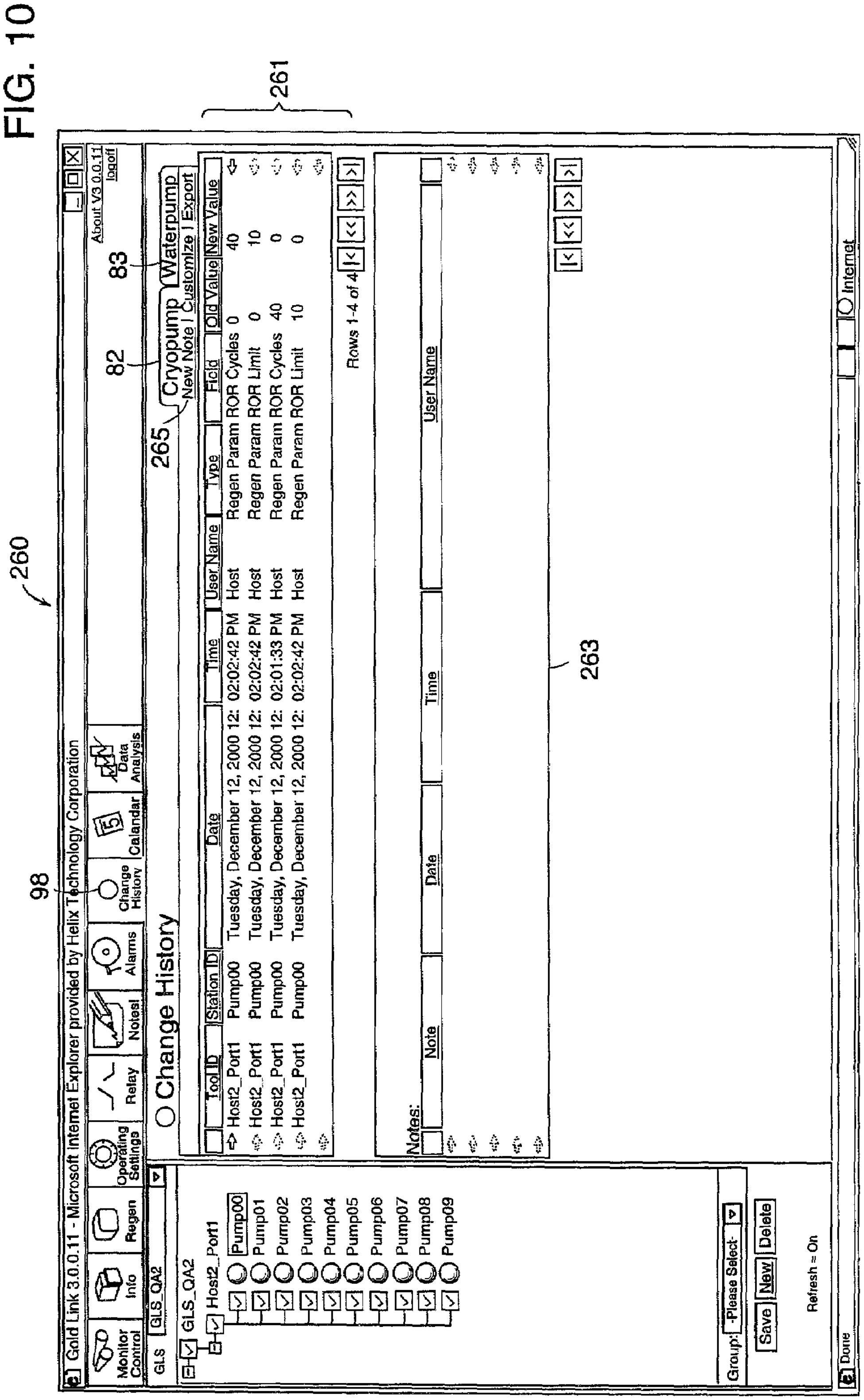
FIG. 10 is an illustrative computer screen display of a Change History, i.e., Command History, screen of an embodiment of the present invention.

FIG. 10 illustrates a Change History screen 260, which is displayed when the "Change History" mode button 98 is selected. The Change History screen 260 presents a list 261 of changes or commands that have been made, and identifies the user who implemented the change. This allows a user to view, in one screen, all changes that have been made.

Previously, a user typically had to navigate through each screen to verify that system parameters were set correctly. With the information provided in the Change History screen, a user knows instantly when and if changes have been made, and by whom.

As with the Notes screen 220 of FIG. 8, a user can, via "New Notes" tab 265, create new notes. Here, a note may be associated with a particular change or command. Upon selection of a line in area 261, the full note is displayed in field 263. A note is also associated with a date, time and user.

The Change History screen 260 is available in both cryopump and waterpump displays, according to the tab 82, 83 selected.

The system determines which user initiated a change or created a note based on the user name entered when the user logged in.

Figure 11:
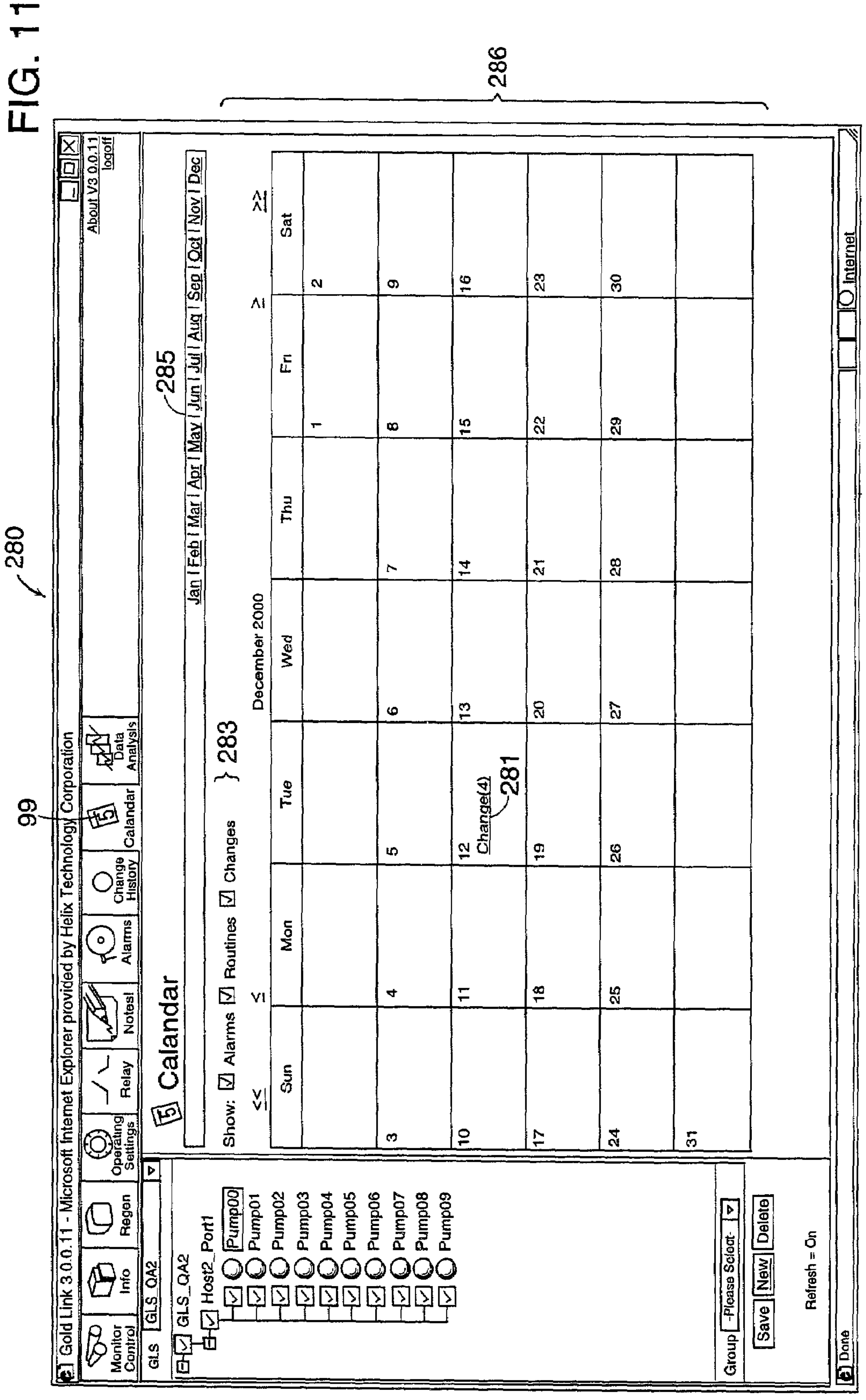
FIG. 11 is an illustrative computer screen display of a Calendar screen of an embodiment of the present invention.

FIG. 11 illustrates a Calendar screen 280, which is displayed when the "Calendar" mode button 99 is selected. In the Calendar mode of operation, the grid notebook 808 and edit panel 810 of FIG. 1B are replaced with a calendar month panel 286. The Calendar screen 280 displays all events, i.e., alarms, changes and regenerations, in a calendar form. This allows the user to view all activity for a given month at one time.

This screen also allows the user to click on an event 281 and proceed directly to the appropriate screen containing that event. For example, if the user clicks on a given alarm, the Alarm screen 240 (FIG. 9) will be presented with that alarm highlighted.

The user can cause the screen to show just alarms, routines or changes, or any combination, by checking the appropriate checkboxes 283.

The user can select one of the monthly tabs 285 to display any month of the last twelve months.

Figure 12:
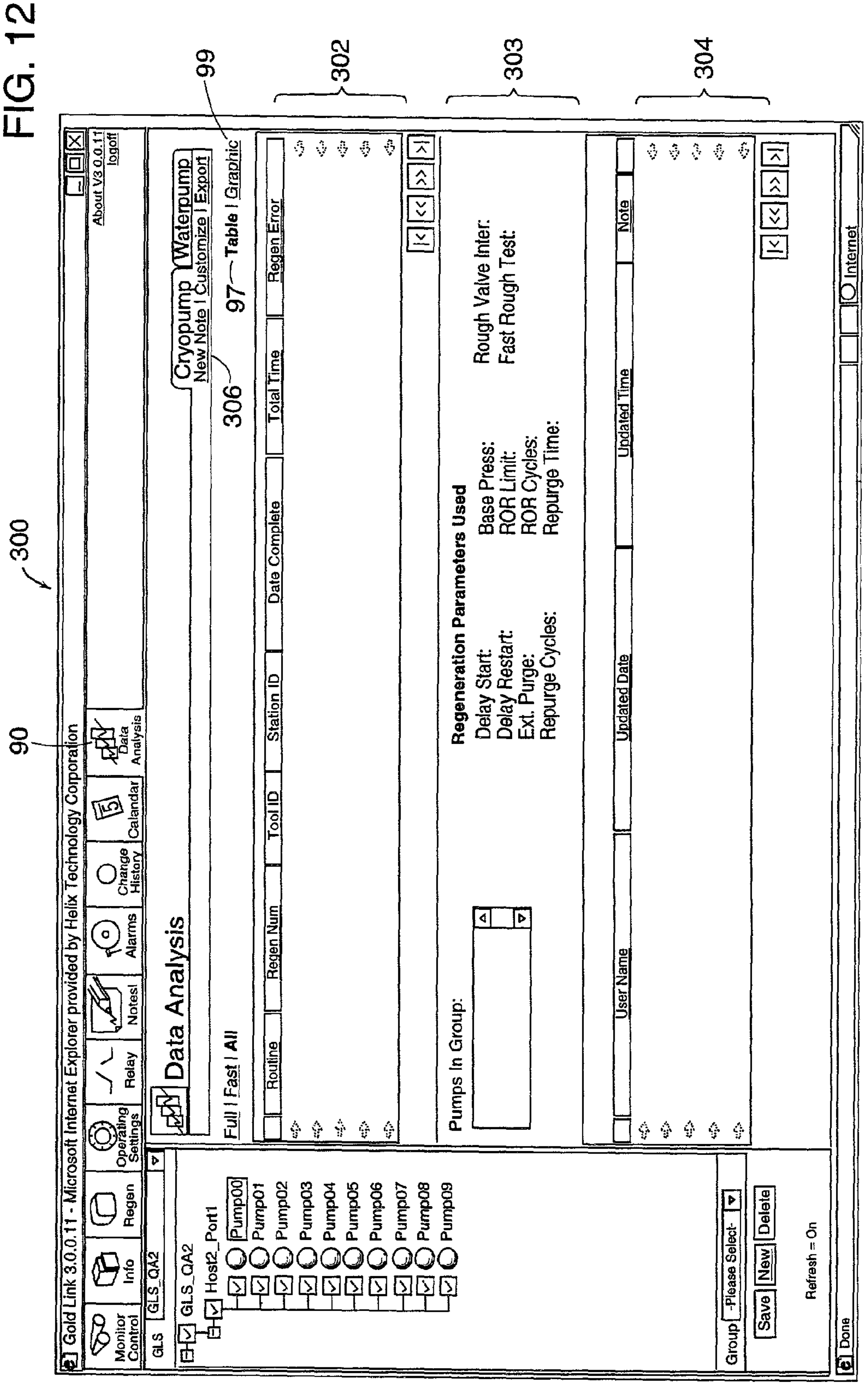
FIGS. 12 and 13 are illustrative computer screen displays of Data Analysis screens of an embodiment of the present invention.

FIG. 12 illustrates a Data Analysis screen 300, which is displayed when the "Data Analysis" mode button 90 is selected and when the "Table" tab 97 is selected. In this mode, both the grid notebook and edit panel are replaced with a data plot 321. The Data Analysis screen 300 allows a user to view information about all regenerations, completed or failed, in field 302. For a selected regeneration, the Data Analysis screen shows, in area 303, the results for each step, the parameters used during the regeneration, and whether the pump was regenerated in a group. Full notes are displayed in area 304

As with the Notes screen 220 of FIG. 8, a user can, via "New Notes" tab 306, create new notes. Here, a note may be associated with a particular regeneration. A note is also associated with a user, date and time.

Figure 13:
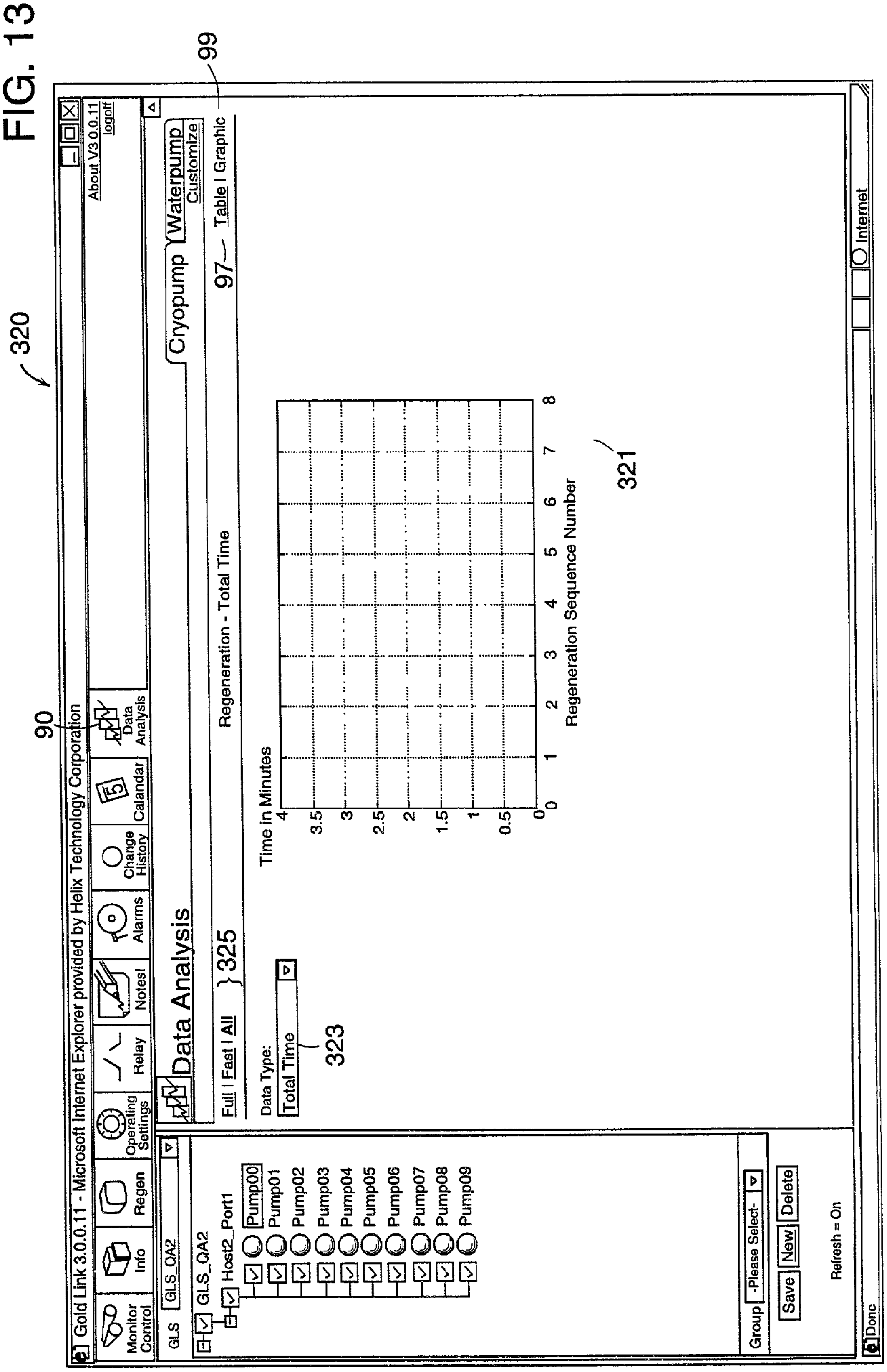

FIG. 13 illustrates a Data Analysis screen 320 as displayed when the "Graphic" tab 99 is selected. This screen displays regeneration data in a graph 321, rather than in a table. Data type to be displayed is selected via control 323.

The "Full", "Fast" and "All" tabs, collectively 325 allow the selection of data for just fall regenerations, fast regenerations or all regenerations respectively.

Figure 14:
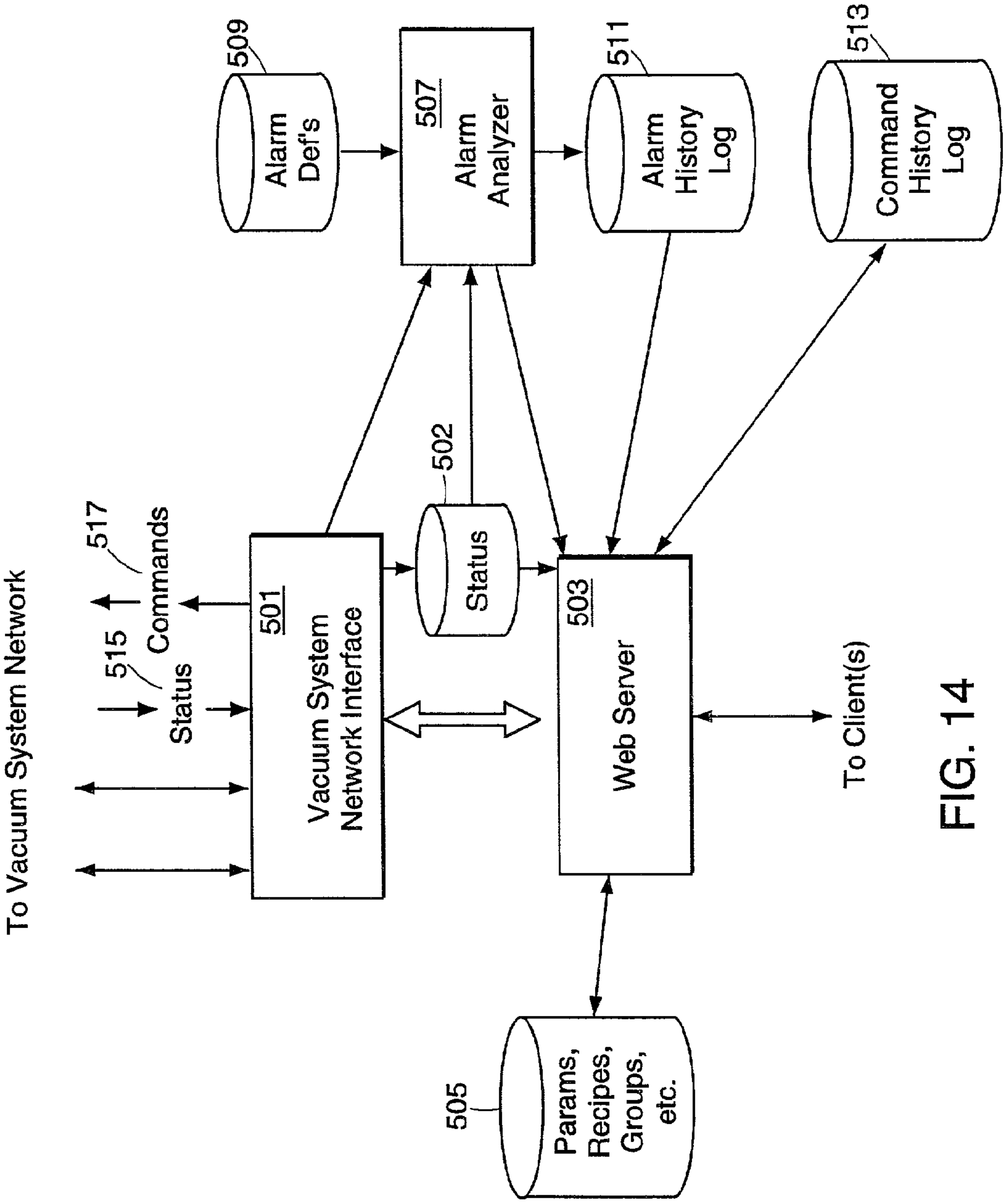
FIG. 14 is a simplified block diagram of a system embodiment of the present invention.

FIG. 14 is a simplified block diagram of the system, and generally corresponds with either of the servers 46, 50 of FIG. 1A.

A vacuum system network interface 501 interfaces with the vacuum system network over one or more ports. Status information 515 from the network is received by the interface 501 while commands 517 are forwarded to the network. Typically, the status information will be stored in a memory or a status database 502.

The received status information is thus available for formatting by a web server 503, which formats selected data and forwards the formatted data to a client upon a request from the client.

The various sets of parameters, regeneration recipes, group definitions, etc., are maintained in a memory such as database 505.

An alarm analyzer 507 compares current status 502 against one or more predefined alarm definitions 509 and provides alarms to the server 503 upon a user request. Old alarms are maintained in an alarm history log 511 for later review.

A command history log 513 is also maintained for later review.

Note that, while the status 502, parameters 505 and logs 511, 513 are all shown as separate databases, one skilled in the art would recognize that one of more of these could be stored in a single database or in a distributed database.

The present invention is concerned with satisfying requests such as HTTP requests received by a web server from a browser. This involves two steps. First, the request is interpreted and any actions the request may entail are performed. Second, an HTML page, containing the outcome of the request, is created for display in the client browser.

Requests may involve, for example, simply displaying a static HTML page, saving or fetching information from a database, and/or performing a calculation. At the web server, a web module is responsible for receiving and responding to these HTTP requests.

Typically, a request contains a screen or mode identifier to identify the screen from which the request was generated. The request also includes the currently viewed or selected tab. An accessor, described below, uses this tab to retrieve the desired data, and the web module uses it to construct the proper screen. In addition, the request contains the SNID for each process element involved in the request. Furthermore, if the request is to update parameters, a special update or similar keyword will appear in the request, along with names of the parameters to be updated, the new values. If the request is for a specific action, a special action keyword will appear in the request, along with any necessary parameters. Finally, the request may contain continuing parameters which identify, for example, the next screen/mode page to be displayed.

To satisfy HTTP requests, the web module communicates with accessor and actionator routines that load information from and save information to a database, and/or obtain information from and perform actions on process elements. Different accessors and actionators are associated with different modes through a mode or screen identifier. In order to satisfy a request, the web module reads in the appropriate response page template from storage, and populates the template with retrieved system information data.

Actionators either write and read persistent data to and from a database, or write real-time data, in one embodiment through a model, to the network equipment. Actionators process requests for actions that are initiated by an operator from the browser. For example, actionators are used to perform regenerations and to zero gauges.

An actionator that works with real-time processes has the SNIDs, provided with the request, translated to process element addresses. That is, where SNIDs, which are unique integers, are used to uniquely identify process elements in the database, three-number addresses, e.g., "1, 12, 27," which determine the network paths to the addressed equipment, are used to identify elements in the vacuum network. A SNID-resolver quickly translates the addresses into a SNIDs, or vice versa.

Figure 15:
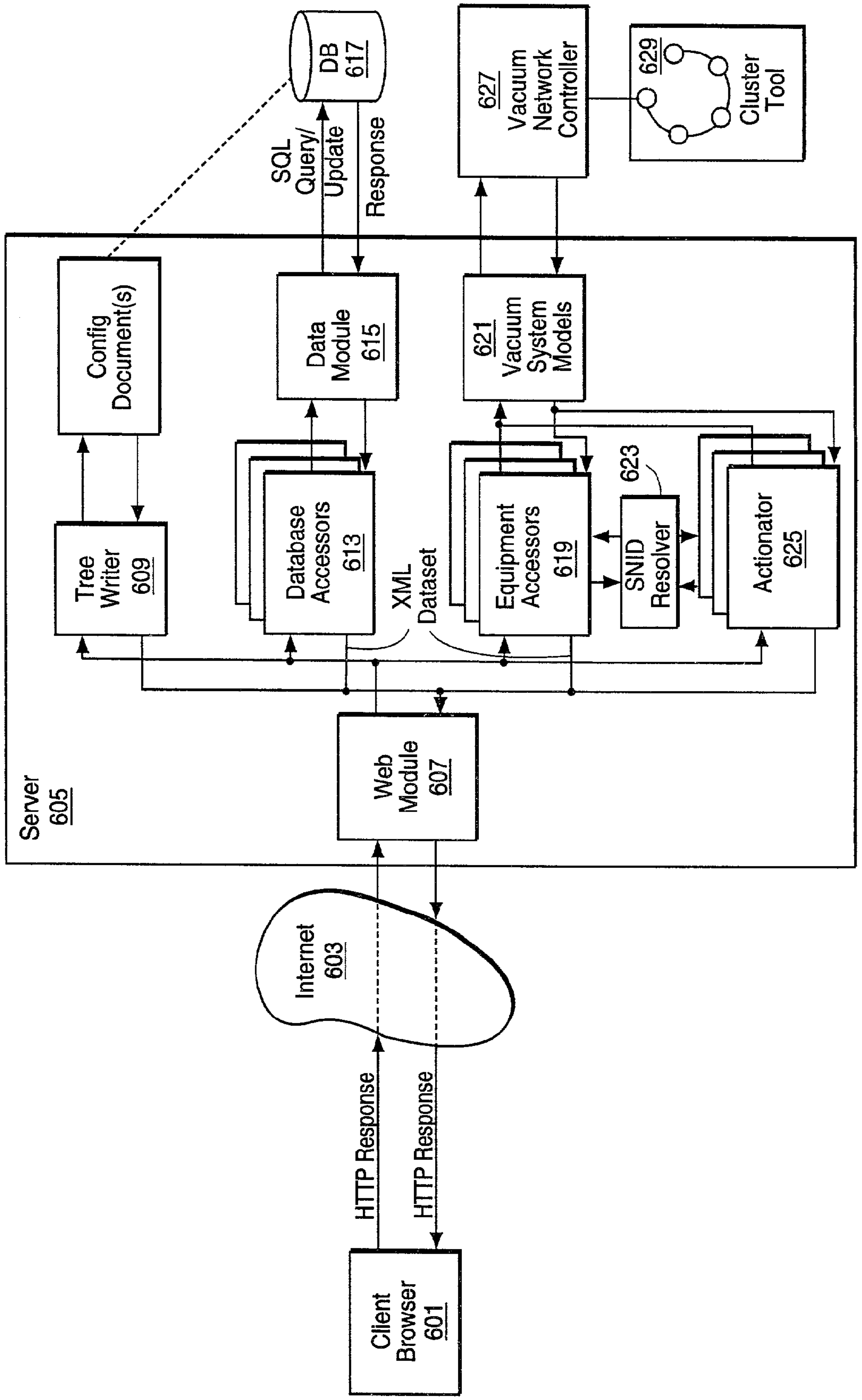
FIG. 15 is a schematic representation of a representative system of the present invention.
Figure 16A:
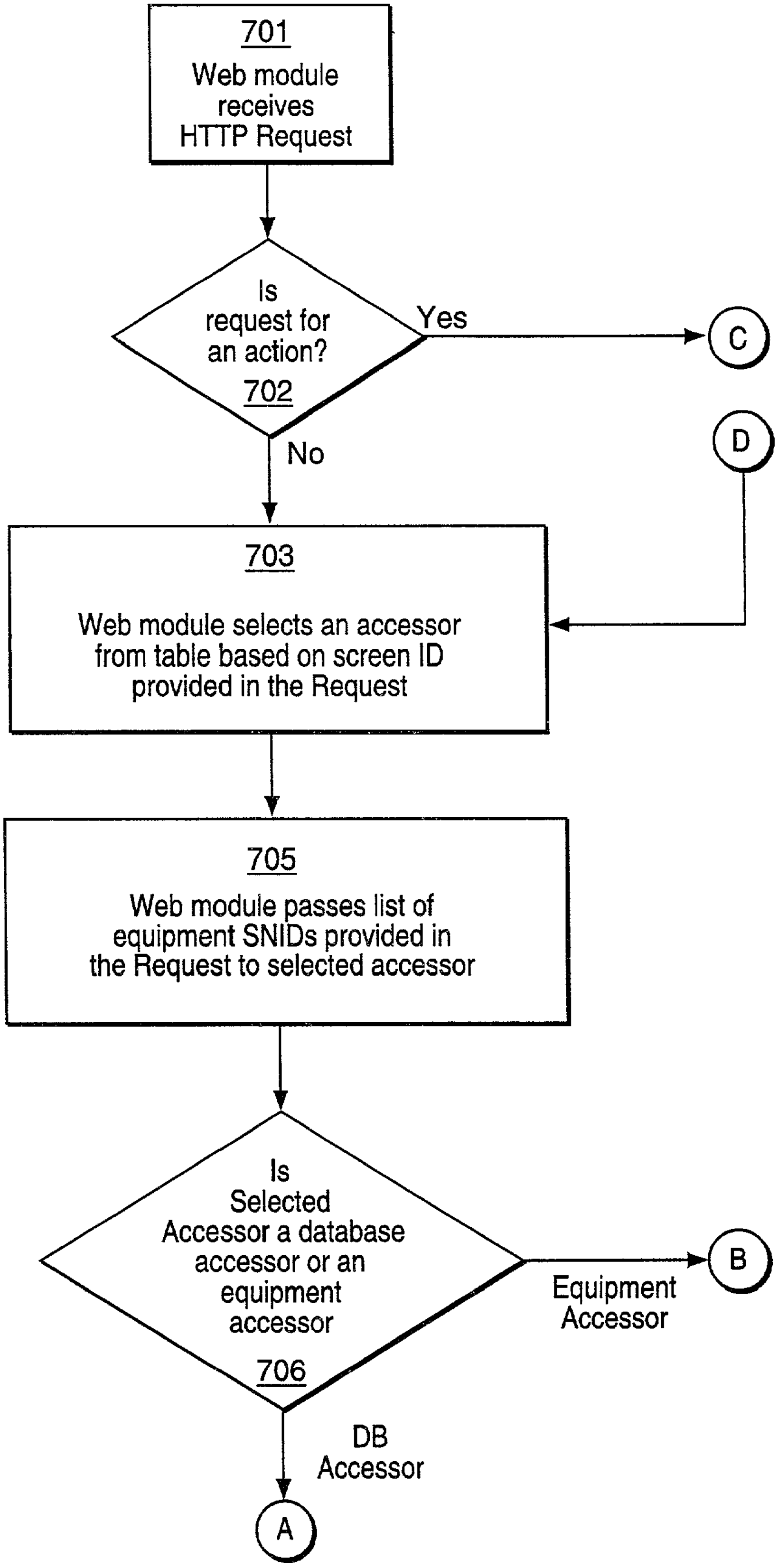
FIGS. 16A–16D are collectively a flowchart illustrating the flow of control within the server of FIG. 15.
Figure 16B:
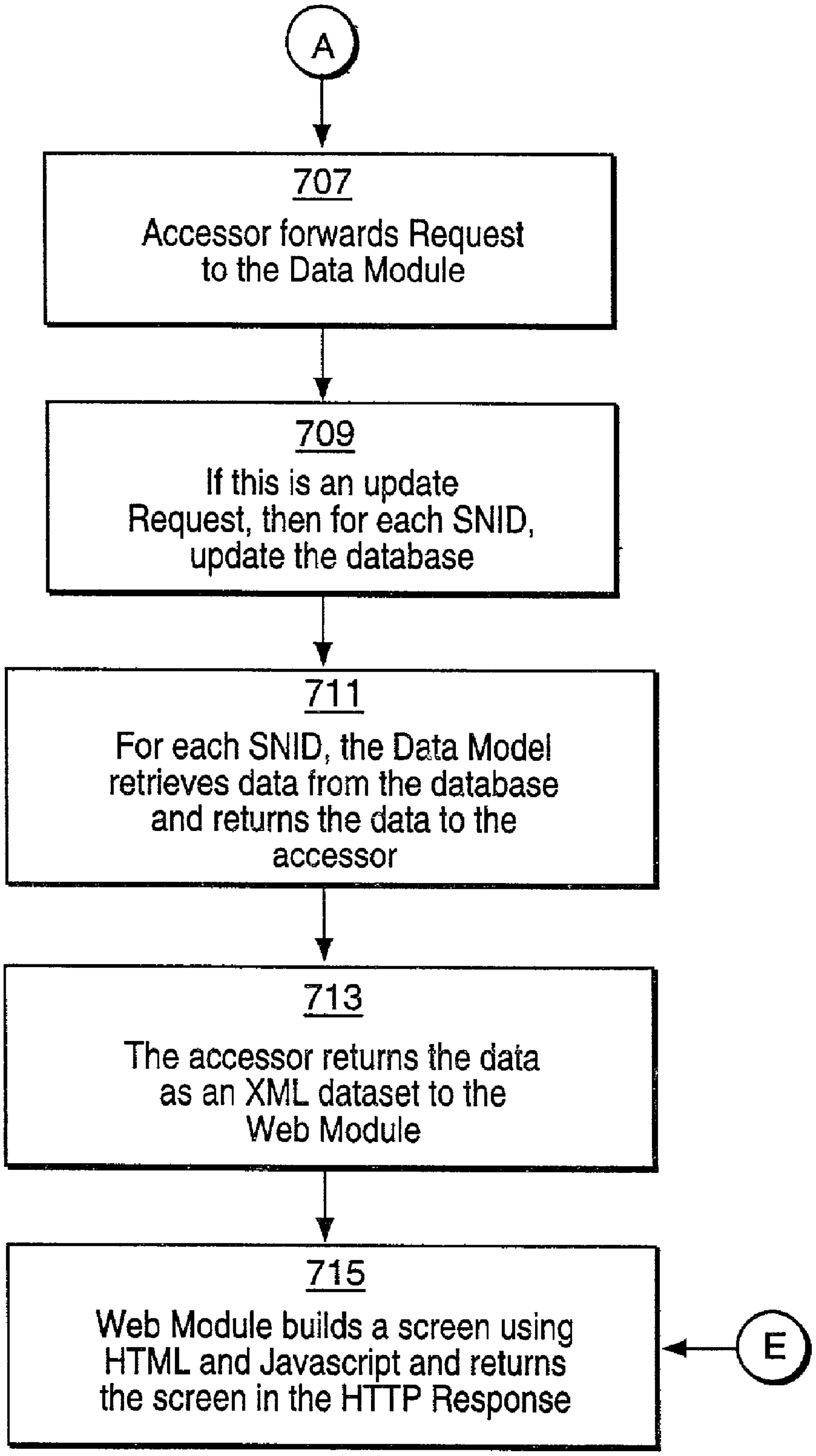
Figure 16C:
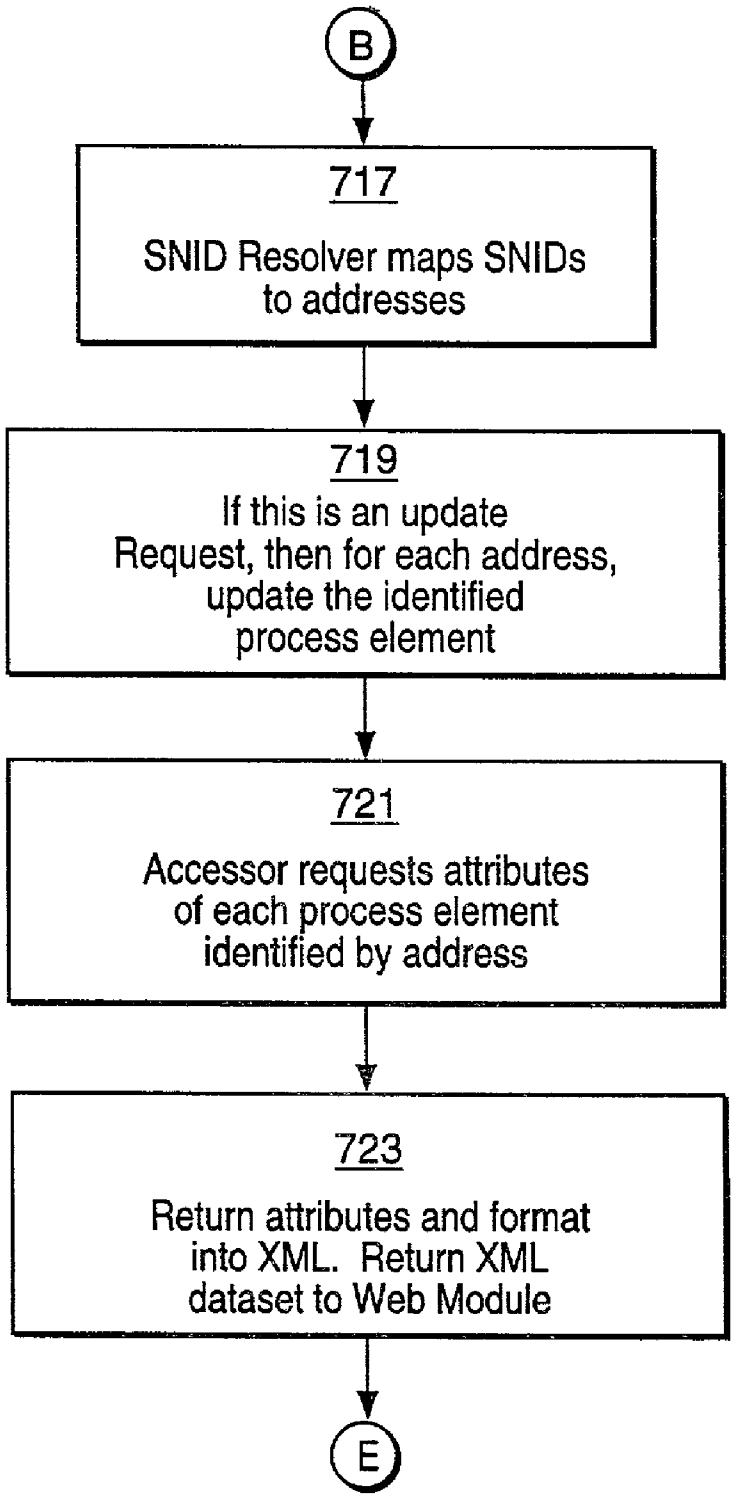
Figure 16D:
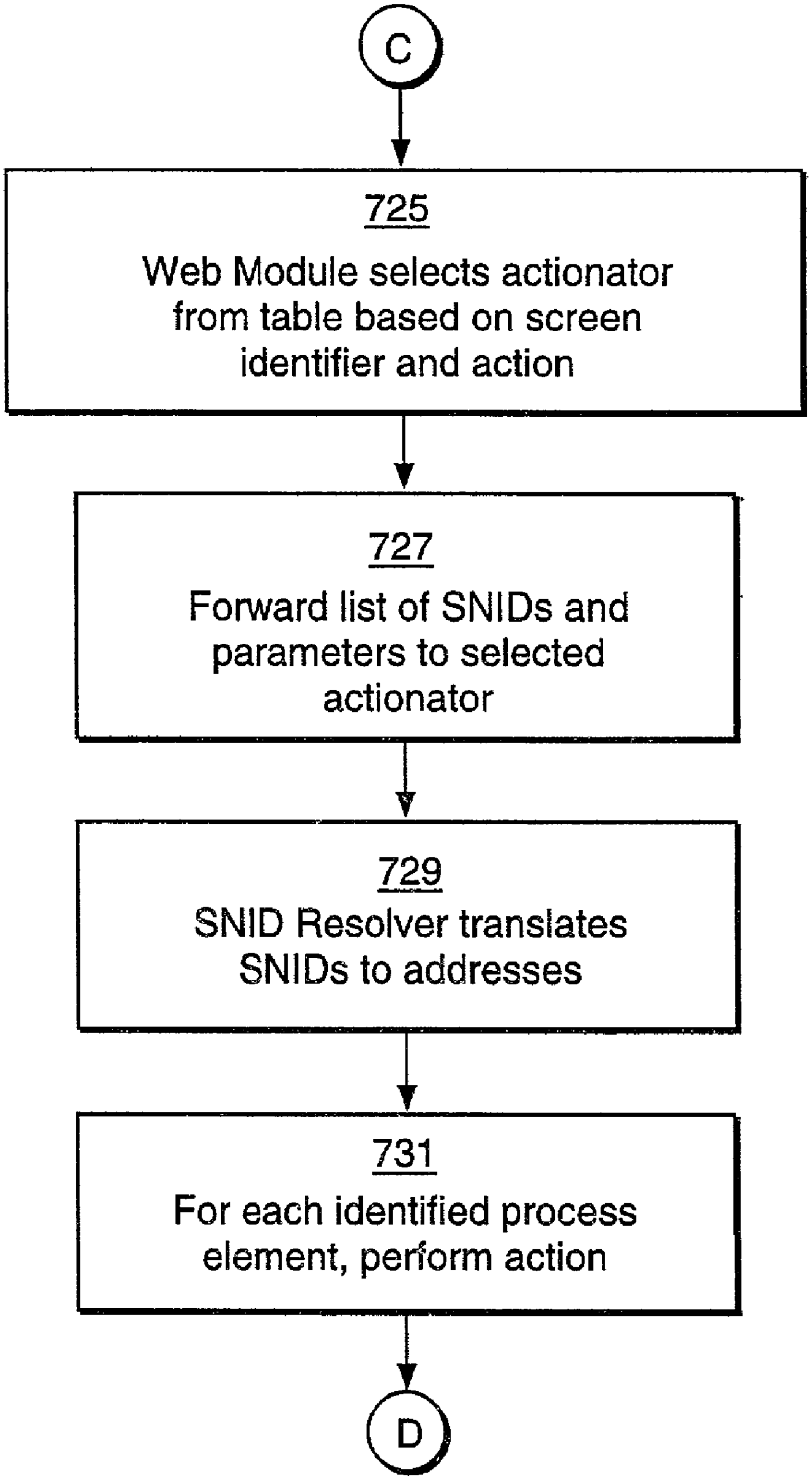

FIG. 15 is a schematic representation of a representative system. Except for requests to the tree writer, discussed below, a request is generated at a client browser 601 when, for example, a user clicks on a tab such as tab/control such as tab 91 of FIG. 2. The request is transmitted to a server 605, through a medium such as the Internet 603. In one embodiment, such requests are HTTP requests. The server 605 corresponds roughly with the web server 503 from FIG. 14.

As described later and with respect to FIGS. 16A–16D, a web module 607 receives the request, and depending on the type of request, forwards the request to any of a tree writer 609, a database accessor 613, an equipment accessor 619 or an actionator 625.

While one skilled in the art would recognize that many formats can be used, a typical request may, for example, have the following format:

[webmoduleURL]/?&mode=[screenID]&tab=[tabID]
&snids=[SNIDlist]&[contParams]

where [webmoduleURL] identifies the web server and web module, such as gls1.fabcite.com/gls.d11; [screenID] identifies the screen; [tabID] identifies the tab; [SNIDlist] is a list of SNIDs that identify the process elements to be displayed]; and the [contParams] comprise parameters which identifies the next screen to be displayed, which in this case would normally be the same screen identified by the screenID parameter.

Requests for stored data are sent by the web module to a database accessor 613. The particular database accessor 613 is selected based on the supplied screen identifier. The selected database accessor passes the request to a data module 615 that, in turn, constructs an SQL query and forwards the query to a database 617 in which the requested data is stored.

The database 617 returns the requested information to the data module 615, which in turn returns the data set to the database accessor 613. The database accessor 613 formats the dataset as an XML dataset and forwards the XML dataset to the web module 607, which constructs an HTTP including HTML and the XML data set. This response is then returned to the client browser 601, which builds the screen.

In one embodiment, the request includes an "update" or similar keyword, along with parameter names and values to be updated. As with a simple request, an update request, which is initiated, for example, when the user at the client 601 fills in certain information such as a field 143 of FIG. 4, is sent from the web module 607 through a database accessor 613 to the data module 615, which constructs and sends an update SQL statement to the database 617. The database then returns an update status to the data module 615, which notifies the accessor 613. The accessor 613 returns the update status to the web module 607. The web module 607 then initiates a new request as described previously in order to update the screen. This updated information is then returned to the client browser 601 as the HTTP response.

When the requested information is to be obtained from the vacuum network equipment, the request is routed from the web module 607 to an equipment accessor 619, rather than a database accessor 613. An equipment accessor 619 is selected based again on the screen identifier. The request is forwarded to a vacuum system model (VSM) 621, which communicates the request to the vacuum network controller 627. The vacuum network controller 627 communicates with vacuum tools 629 and sends a response back to the VSM 621. The VSM 621 returns the response to the equipment accessor 619 which creates a quasi XML dataset, with the benefit that the retrieved data looks exactly like a dataset from the database. Thus, all requested data is formatted in a common way. Note that the equipment accessor 619 accesses the SNID resolver 623 which uses a table to translate SNIDs in the HTTP request to equipment addresses. These addresses are passed on to the VSM 621.

All actions other than updating data are carried out by actionators. Actionators parse and execute user-initiated actions that the web module receive. Note that if the request is an HTTP request, the action is preferably requested using a GET command, although other ways, such as using a POST command, are possible. Actionators also process any error conditions in a common, predictable manner.

In one embodiment of the present invention, action requests may include the following parameters, in addition to those mentioned previously:

Action?actionCode=[aCode]¶ms=[params]

where [aCode] is an action code specifying the action to be performed and [params] are parameters needed by the actionator to perform the requested action.

For action requests, the web module 607, forwards the action to an actionator 625 which is again selected according to the screen identifier. The selected actionator 625 forwards the action command to the VSM 621 which in turn communicates with the VNC 627 to implement the request. The response is returned to the actionator 625 which returns a response to the web module 607. The web module 607 then performs a new request, as described above, in order to provide an updated screen.

The tree writer 609 responds to requests that are generated periodically, for example, every five seconds by the client browser 601, to update the tree 802 (FIG. 2). The tree writer 609 obtains system configuration information 611 to determine how the tree should be constructed. The configuration data 611 may be maintained, for example, in the same database 617 used to store vacuum system data, or in a separate database, file or other means of storage. At the client browser, the tree is built using Java applets which need only be downloaded once. The tree writer updates the tree by providing new information in the form of Java scripts which control the tree-building Java applet.

FIGS. 16A–16D form a flowchart showing the general flow of control that takes place within the server 605 of FIG. 15. At step 701 the web module receives an HTTP request from the client. If the request is a simple data request or an update then at step 703 the web module selects an accessor from an accessor table based on the screen identfer provided in the request. At step 705 the web module passes a list of equipment SNIDs provided by the HTTP request to the selected accessor.

The selected accessor may be a database accessor such as Borland Software Corporation's Delphi XML Broker, which accesses the data from a database, or it may be an equipment accessor which accesses data directly from the equipment.

At step 709, if the request is an update, then for each SNID, the database is updated with the provided data.

In the case of a database accessor, at step 707, the accessor requests data from the data module. If the HTTP request is an update, new data is supplied to the data module as well. For each SNID, which identifies a logical piece of equipment, the data module, at step 711, retrieves data from the database using the SNID to form the SQL query statement or SQL update statement for an update, and returns the data to the accessor.

At step 713, the accessor returns the data set as an XML string to the web module.

Finally, at step 715 the web module builds a screen document using HTML, XML and Javascript based on the returned XML strings. The web module then returns the screen document in an HTTP response.

If at step 706, an equipment accessor is selected because the information is requested from the equipment, then steps 717 through 723 are performed. At step 717, the SNID resolver maps SNIDs provided by the request to equipment addresses. At step 719, if the request is an update request, then for each address, a set of attributes is set as requested. At step 721, the accessor requests, from the VSM, attributes for the equipment specified by the SNIDs translated addresses.

For both requests and updates, at step 723, the attributes' new values are retrieved from the equipment, put into XML format, and returned to the web module. Then, as before (step 715), the web module constructs the screen document using HTML, XML and Javascript and returns the screen document in the HTTP response.

If the HTTP request contains the "action" or equivalent keyword, this request is for an action as determined at 702. In this case, at step 725, the web module selects an actionator from a list of actionators based again on a screen identifier and the requested action or actions. At step 727, the web module passes a list of SNIDs to the actionator. At step 729 the actionator uses the SNID resolver to translate the SNIDs to hardware addresses or equipment addresses.

At step 731, for each of the translator addresses, the actionator communicates with the equipment through the VNC to perform the requested action. After the action has been performed, a simple request is executed as in steps 703 through 715, described earlier, in order to update the screen.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for monitoring a vacuum system, comprising:

receiving a HTTP request from a client browser for vacuum system status information;

retrieving the requested status information;

formatting the retrieved status information; and forwarding, as a response to the request from the client browser, the formatted vacuum system information to the client browser, the response comprising a screen document which the client browser uses to display a screen that is one of plural screens populated with retrieved data;

wherein one of the plural screens is a calendar screen which provides a calendar showing, for each day on the calendar, events which occurred on that day; and wherein an event type is from the group consisting of: alarms, routines and changes.

2. A method for monitoring a vacuum system, comprising:

receiving a HTTP request from a client browser for vacuum system status information;

retrieving the requested status information;

formatting the retrieved status information; and forwarding, as a response to the request from the client browser, the formatted vacuum system information to the client browser, the response comprising a screen document which the client browser uses to display a screen that is one of plural screens populated with retrieved data;

wherein each screen is associated with a unique screen identifier.

3. The method of claim 2, wherein each logical piece of equipment is associated with a unique serial number identifier (SNID), and a network address.

4. The method of claim 3, wherein a request comprises the screen identifier of the currently displayed screen and the SNIDs of equipment from which data is requested, further comprising:

selecting an accessor responsive to the screen identifier; and translating each SNID in the request to a network address if the request is processed by an equipment accessor.

5. The method of claim 2, wherein a request comprises a continuing parameter identifying the next screen to be shown at the browser.

6. The method of claim 2, further comprising:

if the request is for an action, selecting an actionator responsive to the screen identifier; and passing action parameters in the request to the selected actionator, the actionator communicating with the vacuum system to implement the requested action.

7. A method for monitoring a vacuum system, comprising:

receiving a request from a client browser for vacuum system status information, the client request being an update request, containing at least one parameter value to be updated;

retrieving the requested status information;

formatting the retrieved status information; and forwarding, as a response to the request from the client browser, the formatted vacuum system information to the client browser.

8. A method for monitoring a vacuum system, comprising:

receiving a request from a client browser for vacuum system status information;

retrieving the requested status information;

formatting the retrieved status information;

forwarding, as a response to the request from the client browser, the formatted vacuum system information to the client browser; and forwarding a tree document to the client browser, the tree document at the browser displaying the vacuum system in a hierarchical tree, the tree periodically requesting updates.

9. The method of claim 8, wherein the tree document comprises a Java applet and tree updates comprise Javascript scripts which instruct the Java applet how to draw the tree.

10. A method for monitoring a vacuum system, comprising:

receiving a HTTP request from a client browser for vacuum system status information;

retrieving the requested status information;

formatting the retrieved status information; and forwarding, as a response to the request from the client browser, the formatted vacuum system information to the client browser, the response comprising a screen document which the client browser uses to display a screen that is one of plural screens populated with retrieved data;

wherein at least one screen comprises plural tabs, each tab associated with a unique tab identifier, wherein a request comprises a tab identifier associated with a selected tab.

11. A method for monitoring a vacuum system, comprising:

receiving a HTTP request from a client browser for vacuum system status information;

retrieving the requested status information;

formatting the retrieved status information; and forwarding, as a response to the request from the client browser, the formatted vacuum system information to the client browser, the response comprising a screen document which the client browser uses to display a screen;

wherein a currently displayed screen is periodically updated automatically according to a defined update period that is configurable.

12. A method for monitoring a vacuum system, comprising:

receiving a HTTP request from a client browser for vacuum system status information;

retrieving the requested status information;

formatting the retrieved status information; and forwarding, as a response to the request from the client browser, the formatted vacuum system information to the client browser, the response comprising a screen document which the client browser uses to display a screen;

wherein a currently displayed screen is periodically updated automatically according to a defined update period of about thirty seconds.

13. A method for monitoring a vacuum system, comprising:

receiving a HTTP request from a client browser for vacuum system status information;

retrieving the requested status information;

formatting the retrieved status information; and forwarding, as a response to the request from the client browser, the formatted vacuum system information to the client browser, the response comprising a screen document which the client browser uses to display a screen;

wherein a currently displayed screen is periodically updated automatically according to a defined update period and the currently displayed screen is not automatically updated while a user is entering data onto the screen.

14. A monitoring system for monitoring a vacuum system, comprising:

a web module which receives HTTP requests from a client browser for vacuum system status information;

a database accessor which accesses requested status information from a database and provides the accessed status information to the web module; and an equipment accessor which accesses requested status information from the vacuum system and provides the accessed status information to the web module, the database accessor and equipment accessor using the same format to report the accessed status information to the web module, the web module formatting the retrieved status information and forwarding, as a response to the request from the client browser, the formatted vacuum system information to the client browser, the response comprising a screen document which the client browser uses to display a screen that is one of plural screens populated with retrieved data;

wherein one of the plural screens is a calendar screen which provides a calendar showing, for each day on the calendar, events which occurred on that day; and wherein an event type is from the group consisting of: alarms, routines and changes.

15. A monitoring system for monitoring a vacuum system, comprising:

a web module which receives HTTP requests from a client browser for vacuum system status information;

a database accessor which accesses requested status information from a database and provides the accessed status information to the web module; and an equipment accessor which accesses requested status information from the vacuum system and provides the accessed status information to the web module, the database accessor and equipment accessor using the same format to report the accessed status information to the web module, the web module formatting the retrieved status information and forwarding, as a response to the request from the client browser, the formatted vacuum system information to the client browser, the response comprising a screen document which the client browser uses to display a screen that is one of plural screens populated with retrieved data;

wherein each screen is associated with a unique screen identifier.

16. The monitoring system of claim 15, wherein each logical piece of equipment is associated with a unique serial number identifier (SNID), and a network address.

17. The monitoring system of claim 16, wherein a request comprises the screen identifier of the currently displayed screen and the SNIDs of equipment from which data is requested, further comprising:

an accessor table from which an accessor is selected responsive to the screen identifier; and a SNID translator used to translate each SNID in the request to a network address if the request is processed by an equipment accessor.

18. The monitoring system of claim 15, wherein a request comprises a continuing parameter identifying the next screen to be shown at the browser.

19. The monitoring system of claim 15, further comprising:

an actionator table from which an actionator is selected responsive to the screen identifier if the request is for an action, the web module passing action parameters in the request to the selected actionator, the actionator communicating with the vacuum system to implement the requested action.

20. A monitoring system for monitoring a vacuum system, comprising:

a web module which receives requests from a client browser for vacuum system status information;

a database accessor which accesses requested status information from a database and provides the accessed status information to the web module; and an equipment accessor which accesses requested status information from the vacuum system and provides the accessed status information to the web module, the database accessor and equipment accessor using the same format to report the accessed status information to the web module, the web module formatting the retrieved status information and forwarding, as a response to the request from the client browser, the formatted vacuum system information to the client browser;

wherein the client request is an update request, containing at least one parameter value to be updated.

21. A monitoring system for monitoring a vacuum system, comprising:

a web module which receives requests from a client browser for vacuum system status information;

a database accessor which accesses requested status information from a database and provides the accessed status information to the web module;

an equipment accessor which accesses requested status information from the vacuum system and provides the accessed status information to the web module, the database accessor and equipment accessor using the same format to report the accessed status information to the web module, the web module formatting the retrieved status information and forwarding, as a response to the request from the client browser, the formatted vacuum system information to the client browser; and a tree writer which forwards a tree document to the client browser, the tree document at the browser displaying the vacuum system in a hierarchical tree, the tree periodically requesting updates.

22. The monitoring system of claim 21, wherein the tree document comprises a Java applet and tree updates comprise Javascript scripts which instruct the Java applet how to draw the tree.

* * * * *